(12) United States Patent
Streja et al.

(10) Patent No.: US 12,423,917 B2
(45) Date of Patent: Sep. 23, 2025

(54) EXTENDED REALITY BASED DIGITAL ASSISTANT INTERACTIONS

(71) Applicant: Apple Inc., Cupertino, CA (US)

(72) Inventors: Lynn I. Streja, San Francisco, CA (US); Keith P. Avery, Seattle, WA (US); Karan M. Daryanani, San Francisco, CA (US); Stephen O. Lemay, Palo Alto, CA (US); Myra C. Lukens, San Francisco, CA (US); Sreeneel K. Maddika, San Ramon, CA (US); Chaitanya Mannemala, San Ramon, CA (US); Aswath Manoharan, Tucson, AZ (US); Pedro Mari, Santa Cruz, CA (US); Jay Moon, San Francisco, CA (US); Abhishek Rawat, Fremont, CA (US)

(73) Assignee: Apple Inc., Cupertino, CA (US)

( * ) Notice: Subject to any disclaimer, the term of this patent is extended or adjusted under 35 U.S.C. 154(b) by 233 days.

(21) Appl. No.: 18/202,849

(22) Filed: May 26, 2023

(65) Prior Publication Data

US 2023/0401795 A1    Dec. 14, 2023

Related U.S. Application Data

(60) Provisional application No. 63/351,195, filed on Jun. 10, 2022.

(51) Int. Cl.
*G06T 19/00* (2011.01)
*G06F 3/01* (2006.01)
(Continued)

(52) U.S. Cl.
CPC ............ *G06T 19/003* (2013.01); *G06F 3/013* (2013.01); *G06F 3/017* (2013.01); *G06T 13/40* (2013.01);
(Continued)

(58) Field of Classification Search
None
See application file for complete search history.

(56) References Cited

U.S. PATENT DOCUMENTS 7,880,730 B2    2/2011    Robinson et al.
9,250,703 B2    2/2016    Hernandez-Abrego et al.
(Continued)

FOREIGN PATENT DOCUMENTS

CN       104820488 A        8/2015
CN       104969289 A       10/2015
(Continued)

OTHER PUBLICATIONS

International Preliminary Report on Patentability received for PCT Patent Application No. PCT/US2023/024470, mailed on Dec. 19, 2024, 12 pages.
(Continued)

*Primary Examiner* — Hilina K Demeter
(74) *Attorney, Agent, or Firm* — DLA Piper LLP (US)

(57) ABSTRACT

An example process includes: while displaying a portion of an extended reality (XR) environment representing a current field of view of a user: detecting a user gaze at a first object displayed in the XR environment, where the first object is persistent in the current field of view of the XR environment; in response to detecting the user gaze at the first object, expanding the first object into a list of objects including a second object representing a digital assistant; detecting a user gaze at the second object; in accordance with detecting the user gaze at the second object, displaying a first animation of the second object indicating that a digital assistant session is initiated; receiving a first audio input from the
(Continued)

user; and displaying a second animation of the second object indicating that the digital assistant is actively listening to the user.

58 Claims, 19 Drawing Sheets

(51) Int. Cl.
  *G06T 13/40* (2011.01)
  *G10L 15/22* (2006.01)
(52) U.S. Cl.
  CPC ...... *G10L 15/22* (2013.01); *G06T 2219/2012* (2013.01); *G06T 2219/2016* (2013.01); *G06T 2219/2021* (2013.01); *G10L 2015/223* (2013.01)

(56) References Cited

U.S. PATENT DOCUMENTS

| | | |
|---|---|---|
| 9,274,598 B2 | 3/2016 | Beymer et al. |
| 9,607,612 B2 | 3/2017 | Deleeuw |
| 9,697,829 B1 | 7/2017 | Tickner et al. |
| 9,886,953 B2 | 2/2018 | Lemay et al. |
| 10,025,378 B2 | 7/2018 | Venable et al. |
| 10,048,748 B2 | 8/2018 | Sridharan et al. |
| 10,083,688 B2 | 9/2018 | Piernot et al. |
| 10,180,572 B2 | 1/2019 | Osterhout et al. |
| 10,199,051 B2 | 2/2019 | Binder et al. |
| 10,228,904 B2 | 3/2019 | Raux |
| 10,242,501 B1 | 3/2019 | Pusch et al. |
| 10,269,345 B2 | 4/2019 | Castillo Sanchez et al. |
| 10,283,111 B1 | 5/2019 | Mairesse et al. |
| 10,317,992 B2 | 6/2019 | Prokofieva et al. |
| 10,373,381 B2 | 8/2019 | Nuernberger et al. |
| 10,416,760 B2 | 9/2019 | Burns et al. |
| 10,418,032 B1 | 9/2019 | Mohajer et al. |
| 10,504,518 B1 | 12/2019 | Irani et al. |
| 10,684,703 B2 | 6/2020 | Hindi et al. |
| 10,832,031 B2 | 11/2020 | Kienzle et al. |
| 10,944,859 B2 | 3/2021 | Weinstein et al. |
| 10,978,090 B2 | 4/2021 | Binder et al. |
| 11,009,970 B2 | 5/2021 | Hindi et al. |
| 11,037,565 B2 | 6/2021 | Kudurshian et al. |
| 11,076,039 B2 | 7/2021 | Weinstein et al. |
| 11,181,980 B2 | 11/2021 | Deleeuw |
| 11,211,058 B1 | 12/2021 | Eakin et al. |
| 11,507,183 B2 | 11/2022 | Manjunath et al. |
| 2012/0259638 A1 | 10/2012 | Kalinli |
| 2013/0304479 A1 | 11/2013 | Teller et al. |
| 2014/0218372 A1* | 8/2014 | Missig ............... G06F 3/04883 345/173 |
| 2014/0222436 A1 | 8/2014 | Binder et al. |
| 2014/0237366 A1 | 8/2014 | Poulos et al. |
| 2014/0361973 A1 | 12/2014 | Raux et al. |
| 2015/0033130 A1 | 1/2015 | Scheessele |
| 2015/0113454 A1 | 4/2015 | Mclaughlin |
| 2015/0154001 A1 | 6/2015 | Knox et al. |
| 2015/0169053 A1 | 6/2015 | Bozarth et al. |
| 2015/0193005 A1 | 7/2015 | Di et al. |
| 2015/0193018 A1 | 7/2015 | Venable et al. |
| 2015/0269943 A1 | 9/2015 | Vanblon et al. |
| 2015/0364140 A1 | 12/2015 | Thörn |
| 2016/0062459 A1 | 3/2016 | Publicover et al. |
| 2016/0091967 A1 | 3/2016 | Prokofieva et al. |
| 2016/0092074 A1 | 3/2016 | Raux et al. |
| 2016/0116980 A1 | 4/2016 | George-Svahn et al. |
| 2016/0195924 A1 | 7/2016 | Weber et al. |
| 2016/0320838 A1 | 11/2016 | Teller et al. |
| 2016/0371054 A1 | 12/2016 | Beaumont et al. |
| 2017/0171261 A1 | 6/2017 | Smus |
| 2017/0177080 A1 | 6/2017 | Deleeuw |
| 2017/0235360 A1 | 8/2017 | George-Svahn |
| 2017/0262051 A1 | 9/2017 | Tall et al. |
| 2017/0270715 A1 | 9/2017 | Lindsay et al. |
| 2018/0103357 A1 | 4/2018 | Liu |
| 2018/0157398 A1 | 6/2018 | Kaehler et al. |
| 2018/0233139 A1* | 8/2018 | Finkelstein ............ G10L 17/08 |
| 2018/0366118 A1 | 12/2018 | Lovitt et al. |
| 2019/0019508 A1 | 1/2019 | Rochford et al. |
| 2019/0065027 A1 | 2/2019 | Hauenstein et al. |
| 2019/0122692 A1 | 4/2019 | Binder et al. |
| 2019/0187787 A1* | 6/2019 | White ..................... G06F 3/013 |
| 2019/0220247 A1* | 7/2019 | Lemay ................ G06F 16/9562 |
| 2019/0259386 A1 | 8/2019 | Kudurshian et al. |
| 2019/0341040 A1* | 11/2019 | Kirazci ................. G06F 3/0485 |
| 2019/0362557 A1 | 11/2019 | Lacey et al. |
| 2019/0370292 A1 | 12/2019 | Irani et al. |
| 2019/0371316 A1 | 12/2019 | Weinstein et al. |
| 2019/0391726 A1 | 12/2019 | Iskandar et al. |
| 2020/0097246 A1* | 3/2020 | McCoy .................... G06F 3/165 |
| 2020/0103963 A1 | 4/2020 | Kelly et al. |
| 2020/0218074 A1 | 7/2020 | Hoover et al. |
| 2020/0219501 A1 | 7/2020 | Cartwright et al. |
| 2020/0225747 A1* | 7/2020 | Bar-Zeev ................. H04B 5/70 |
| 2020/0227034 A1 | 7/2020 | Summa et al. |
| 2020/0279576 A1 | 9/2020 | Binder et al. |
| 2020/0341546 A1 | 10/2020 | Yuan et al. |
| 2020/0349966 A1 | 11/2020 | Konzelmann et al. |
| 2021/0042979 A1* | 2/2021 | Ballagas ............... G02B 27/017 |
| 2021/0081749 A1 | 3/2021 | Claire |
| 2021/0089124 A1* | 3/2021 | Manjunath ............ G06F 3/011 |
| 2021/0097776 A1 | 4/2021 | Faulkner et al. |
| 2021/0151070 A1 | 5/2021 | Binder et al. |
| 2021/0256980 A1 | 8/2021 | George-Svahn et al. |
| 2021/0295602 A1 | 9/2021 | Scapel et al. |
| 2021/0365161 A1 | 11/2021 | Ellis et al. |
| 2021/0365174 A1 | 11/2021 | Ellis et al. |
| 2022/0114327 A1 | 4/2022 | Faaborg et al. |
| 2022/0155857 A1* | 5/2022 | Lee .......................... G06F 3/013 |
| 2022/0206298 A1 | 6/2022 | Goodman |
| 2022/0230653 A1 | 7/2022 | Binder et al. |
| 2022/0293124 A1 | 9/2022 | Weinberg et al. |
| 2022/0293125 A1 | 9/2022 | Maddika et al. |
| 2022/0406309 A1 | 12/2022 | Piernot et al. |
| 2023/0035941 A1 | 2/2023 | Herman et al. |
| 2023/0081605 A1 | 3/2023 | O'Mara et al. |
| 2023/0098174 A1 | 3/2023 | Simes et al. |
| 2023/0335132 A1 | 10/2023 | Garcia et al. |
| 2023/0368812 A1 | 11/2023 | Marchi et al. |
| 2023/0386469 A1 | 11/2023 | Horton et al. |
| 2024/0087566 A1 | 3/2024 | Piernot et al. |
| 2024/0118744 A1 | 4/2024 | Vaughan et al. |
| 2024/0177424 A1 | 5/2024 | Herman et al. |
| 2024/0248678 A1 | 7/2024 | Krivoruchko et al. |

FOREIGN PATENT DOCUMENTS

| | | |
|---|---|---|
| CN | 106558310 A | 4/2017 |
| CN | 107003738 A | 8/2017 |
| CN | 107589841 A | 1/2018 |
| CN | 111722716 A | 9/2020 |
| EP | 2551784 A1 | 1/2013 |
| EP | 2801890 A1 | 11/2014 |
| EP | 3155500 B1 | 7/2018 |
| EP | 3859494 A1 | 8/2021 |
| EP | 3913475 A1 | 11/2021 |
| EP | 4281855 A1 | 11/2023 |
| JP | 2016-508007 A | 3/2016 |
| JP | 7487276 B2 | 5/2024 |
| KR | 10-2016-0127165 A | 11/2016 |
| KR | 10-2021-0002722 A | 1/2021 |
| KR | 10-2677096 B1 | 6/2024 |
| WO | 2014/124332 A2 | 8/2014 |
| WO | 2016/049439 A1 | 3/2016 |
| WO | 2016/089638 A1 | 6/2016 |
| WO | 2018/018810 A1 | 2/2018 |
| WO | 2018/090060 A1 | 5/2018 |
| WO | 2019/212569 A1 | 11/2019 |
| WO | 2019/236217 A1 | 12/2019 |
| WO | 2021/061349 A1 | 4/2021 |
| WO | 2021/076164 A1 | 4/2021 |
| WO | 2021/188439 A1 | 9/2021 |

(56) References Cited

FOREIGN PATENT DOCUMENTS

| WO | WO-2022066395 A1 * | 3/2022 | ............ G06F 3/013 |
|----|----|----|----|
| WO | 2022/093401 A1 | 5/2022 | |
| WO | 2022/182668 A1 | 9/2022 | |
| WO | 2023/239663 A1 | 12/2023 | |

OTHER PUBLICATIONS

International Search Report and Written Opinion received for PCT Patent Application No. PCT/US2023/024470, mailed on Nov. 3, 2023, 15 pages.

* cited by examiner

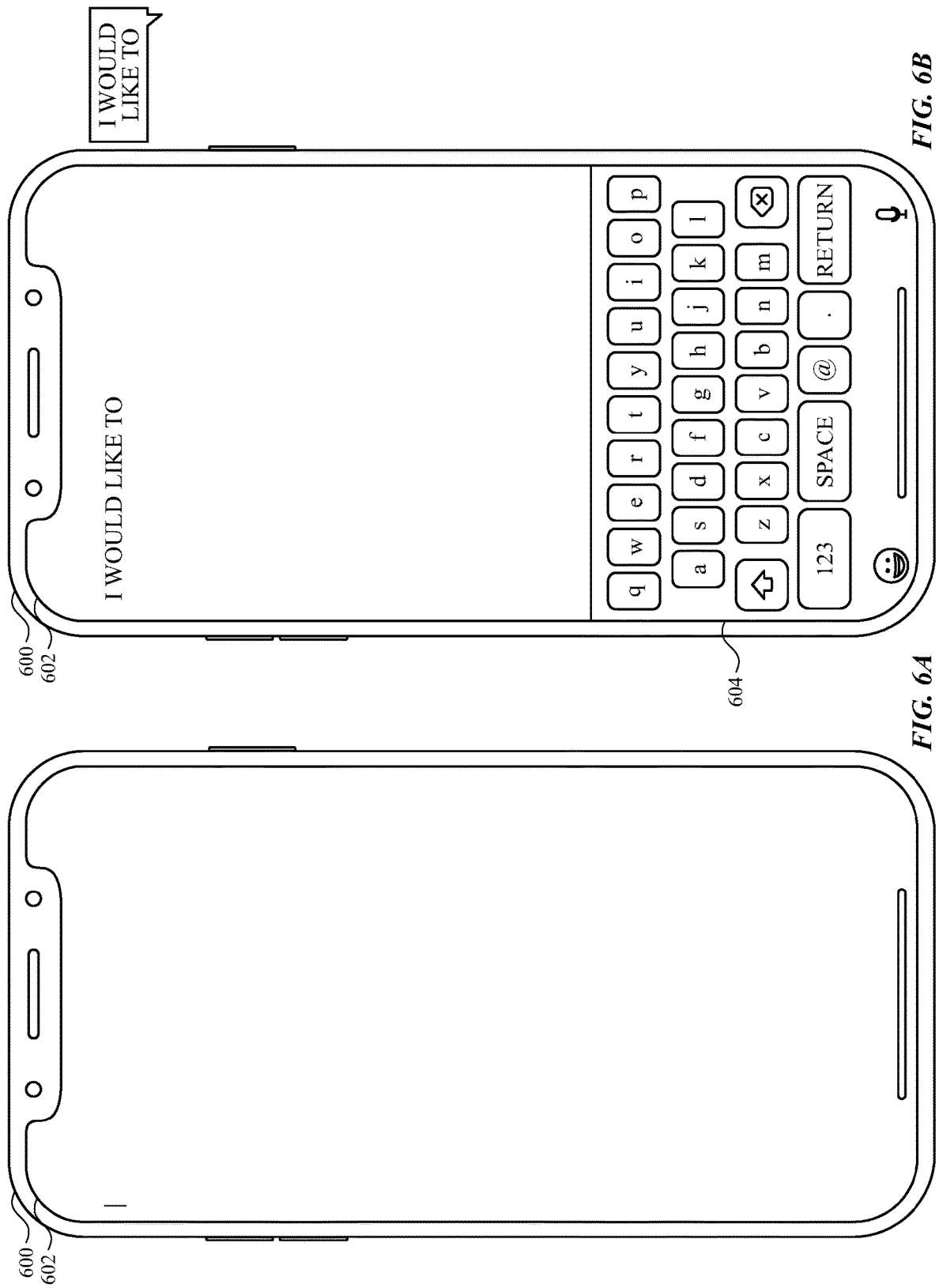

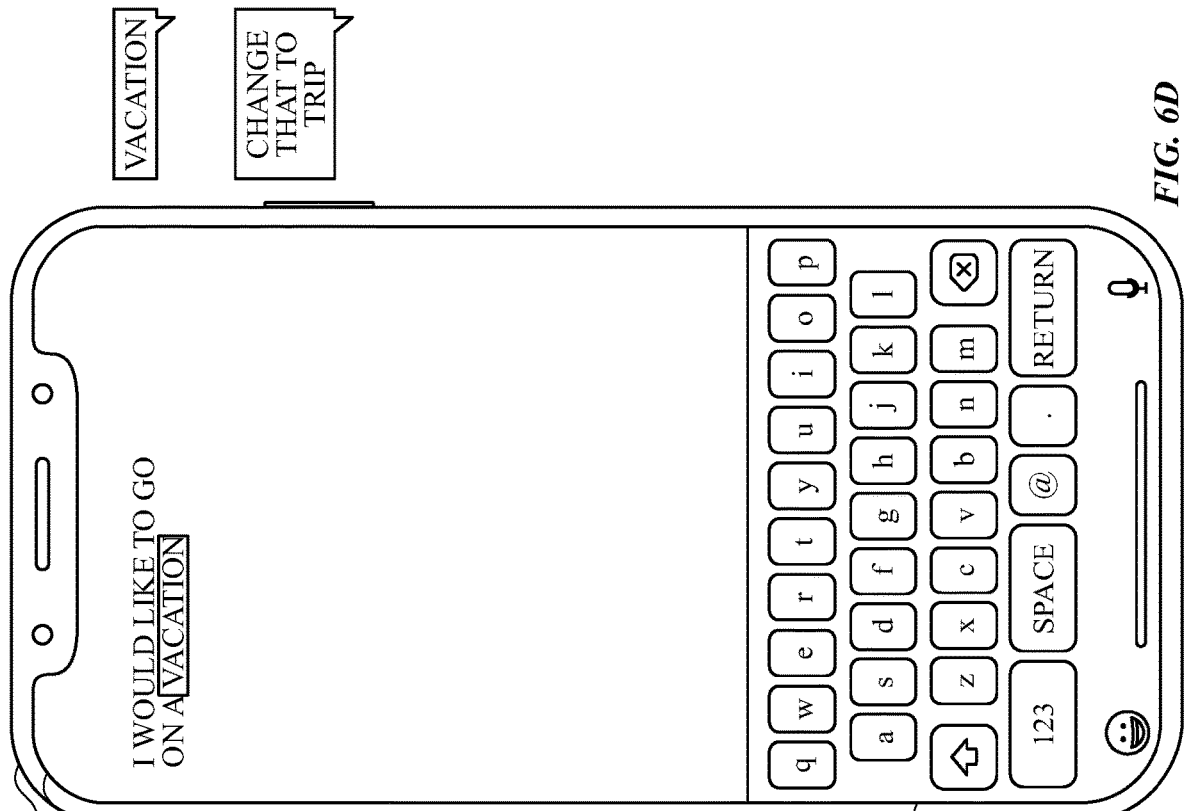
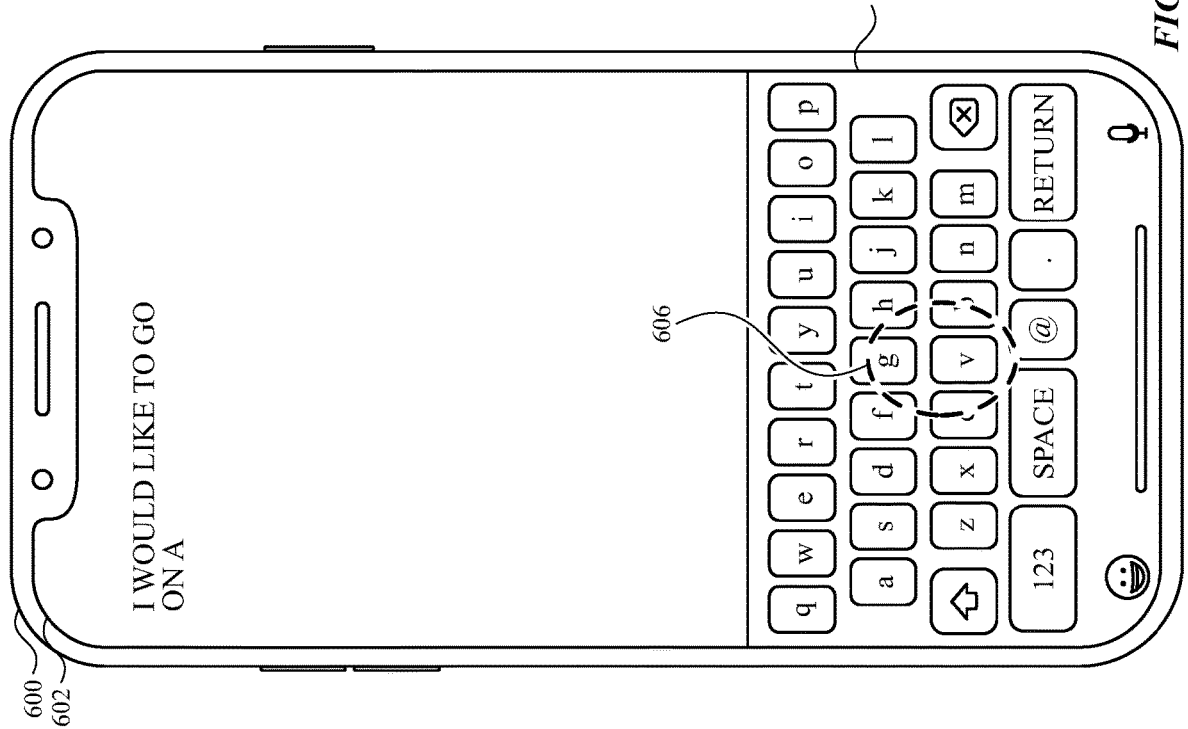
*FIG. 6C*  *FIG. 6D*

EXTENDED REALITY BASED DIGITAL ASSISTANT INTERACTIONS

CROSS-REFERENCE TO RELATED APPLICATIONS

This application claims priority to U.S. Provisional Patent Application Ser. No. 63/351,195, entitled "EXTENDED REALITY BASED DIGITAL ASSISTANT INTERACTIONS," filed on Jun. 10, 2022, the content of which is hereby incorporated by reference in its entirety.

FIELD

This relates generally to digital assistants.

BACKGROUND

Digital assistants can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

SUMMARY

Example methods are disclosed herein. An example method includes: at an electronic device with one or more processors, memory, a display, and one or more sensors: while displaying a portion of an extended reality (XR) environment representing a current field of view of a user of the electronic device: detecting, with the one or more sensors, a user gaze at a first object displayed in the XR environment, where the first object is persistent in the current field of view of the XR environment; in response to detecting the user gaze at the first object, expanding the first object into a list of objects, where the list of objects includes a second object representing a digital assistant; detecting, with the one or more sensors, a user gaze at the second object; in accordance with detecting the user gaze at the second object, displaying a first animation of the second object indicating that a digital assistant session is initiated; receiving a first audio input from the user of the electronic device; and displaying a second animation of the second object indicating that the digital assistant is actively listening to the user in response to receiving the first audio input, where the first animation is different from the second animation of the second object.

Example non-transitory computer-readable media are disclosed herein. An example non-transitory computer-readable storage medium stores one or more programs. The one or more programs comprise instructions, which when executed by one or more processors of an electronic device with a display and one or more sensors, cause the electronic device to: while displaying a portion of an extended reality (XR) environment representing a current field of view of a user of the electronic device: detect, with the one or more sensors, a user gaze at a first object displayed in the XR environment, where the first object is persistent in the current field of view of the XR environment; in response to detecting the user gaze at the first object, expand the first object into a list of objects, where the list of objects includes a second object representing a digital assistant; detect, with the one or more sensors, a user gaze at the second object; in accordance with detecting the user gaze at the second object, display a first animation of the second object indicating that a digital assistant session is initiated; receive a first audio input from the user of the electronic device; and display a second animation of the second object indicating that the digital assistant is actively listening to the user in response to receiving the first audio input, where the first animation is different from the second animation of the second object.

Example electronic devices are disclosed herein. An example electronic device comprises a display; one or more sensors; one or more processors; a memory; and one or more programs, where the one or more programs are stored in the memory and configured to be executed by the one or more processors, the one or more programs including instructions for: while displaying a portion of an extended reality (XR) environment representing a current field of view of a user of the electronic device: detecting, with the one or more sensors, a user gaze at a first object displayed in the XR environment, where the first object is persistent in the current field of view of the XR environment; in response to detecting the user gaze at the first object, expanding the first object into a list of objects, where the list of objects includes a second object representing a digital assistant; detecting, with the one or more sensors, a user gaze at the second object; in accordance with detecting the user gaze at the second object, displaying a first animation of the second object indicating that a digital assistant session is initiated; receiving a first audio input from the user of the electronic device; and displaying a second animation of the second object indicating that the digital assistant is actively listening to the user in response to receiving the first audio input, where the first animation is different from the second animation of the second object.

An example electronic device comprises means for: while displaying a portion of an extended reality (XR) environment representing a current field of view of a user of the electronic device: detecting, with one or more sensors, a user gaze at a first object displayed in the XR environment, where the first object is persistent in the current field of view of the XR environment; in response to detecting the user gaze at the first object, expanding the first object into a list of objects, where the list of objects includes a second object representing a digital assistant; detecting, the one or more sensors, a user gaze at the second object; in accordance with detecting the user gaze at the second object, displaying a first animation of the second object indicating that a digital assistant session is initiated; receiving a first audio input from the user of the electronic device; and displaying a second animation of the second object indicating that the digital assistant is actively listening to the user in response to receiving the first audio input, where the first animation is different from the second animation of the second object.

Expanding the first object into a list of objects and displaying the first and second animations of the second object when respective predetermined conditions are met allows the device to accurately and efficiently initiate a digital assistant session in an XR environment. Further, the techniques discussed herein provide the user with feedback that a digital assistant session is initiated and responding to a user request. Further, having the first object be persistent in the current field of view improves the digital assistant's availability, which in turn, allows for the digital assistant to efficiently assist the user with tasks related to the XR environment. In this manner, the user-device interaction is made more efficient (e.g., by reducing the number of user inputs required to perform the tasks, by reducing the cognitive burden on the user to perform the tasks, by preventing digital assistant sessions from being incorrectly initiated, by informing a user that a digital assistant session is available for initiation), which additionally, reduces power usage and improves device battery life by enabling quicker and more efficient device usage.

Example methods are disclosed herein. An example method includes: while displaying an object having a first display state, initiating a digital assistant session responsive to receiving user input; and while the digital assistant session is initiated: in accordance with a determination, based on captured user gaze input, that a user gaze is directed at the object, modifying the first display state of the object to a second display state; and after modifying the first display state to the second display state: receiving a speech input; determining, based on the captured user gaze input, whether the speech input corresponds to interaction with the object; and in accordance with a determination that the speech input corresponds to interaction with the object: initiating a task based on the speech input and the object; and providing an output indicative of the initiated task.

Example non-transitory computer-readable media are disclosed herein. An example non-transitory computer-readable storage medium stores one or more programs. The one or more programs comprise instructions, which when executed by one or more processors of an electronic device with a display, cause the electronic device to: while displaying an object having a first display state, initiate a digital assistant session responsive to receiving user input; and while the digital assistant session is initiated: in accordance with a determination, based on captured user gaze input, that a user gaze is directed at the object, modify the first display state of the object to a second display state; and after modifying the first display state to the second display state: receive a speech input; determine, based on the captured user gaze input, whether the speech input corresponds to interaction with the object; and in accordance with a determination that the speech input corresponds to interaction with the object: initiate a task based on the speech input and the object; and provide an output indicative of the initiated task.

Example electronic devices are disclosed herein. An example electronic device comprises a display; one or more processors; a memory; and one or more programs, where the one or more programs are stored in the memory and configured to be executed by the one or more processors, the one or more programs including instructions for: while displaying an object having a first display state, initiating a digital assistant session responsive to receiving user input; and while the digital assistant session is initiated: in accordance with a determination, based on captured user gaze input, that a user gaze is directed at the object, modifying the first display state of the object to a second display state; and after modifying the first display state to the second display state: receiving a speech input; determining, based on the captured user gaze input, whether the speech input corresponds to interaction with the object; and in accordance with a determination that the speech input corresponds to interaction with the object: initiating a task based on the speech input and the object; and providing an output indicative of the initiated task.

An example electronic device comprises means for: while displaying an object having a first display state, initiating a digital assistant session responsive to receiving user input; and while the digital assistant session is initiated: in accordance with a determination, based on captured user gaze input, that a user gaze is directed at the object, modifying the first display state of the object to a second display state; and after modifying the first display state to the second display state: receiving a speech input; determining, based on the captured user gaze input, whether the speech input corresponds to interaction with the object; and in accordance with a determination that the speech input corresponds to interaction with the object: initiating a task based on the speech input and the object; and providing an output indicative of the initiated task.

Modifying the first display state to the second display state provides the user with feedback about the object(s) that they can interact with using a digital assistant. Further, modifying the first display state to the second display state when predetermined conditions are met allows the device to indicate an object of current user interest, which prevents cluttering the user interface with indications of objects of lesser user interest. Further, determining whether the speech input corresponds to interaction with the object (e.g., using the techniques described herein) allows the device to accurately and efficiently determine the correct object a user intends to interact with. In this manner, the user-device interaction is made more efficient (e.g., by preventing users from issuing requests that a digital assistant cannot handle, by reducing the number and/or duration of user inputs required to interact with objects, by helping the user provide correct requests to the digital assistant, by allowing the digital assistant to efficiently perform user requested tasks), which additionally, reduces power usage and improves device battery life by enabling quicker and more efficient device usage.

BRIEF DESCRIPTION OF FIGURES

FIGS. 6A-6E illustrate techniques for dictation using a device, according to some examples.

DESCRIPTION

Figure 1A:
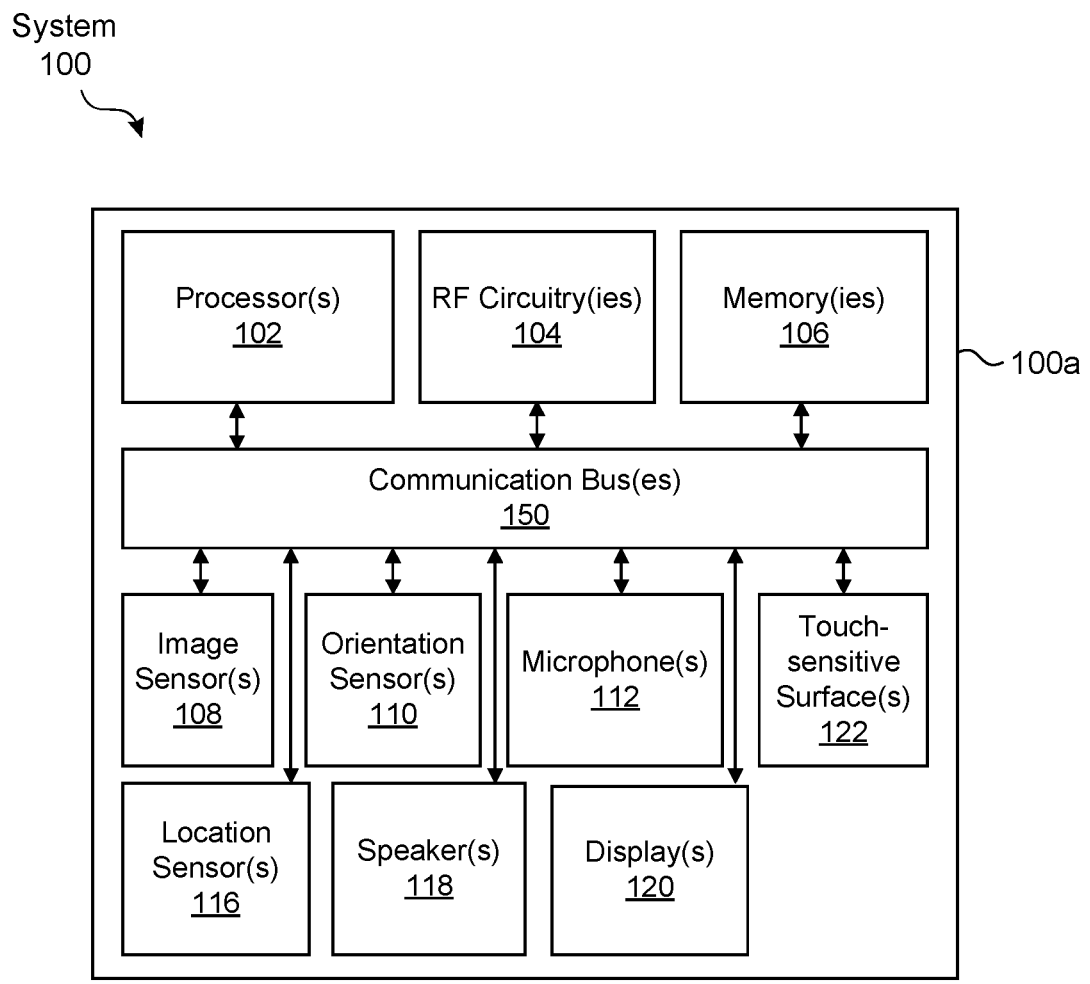
FIGS. 1A-1B depict exemplary systems for use in various computer-generated reality technologies, including virtual reality and mixed reality.

Various examples of electronic systems and techniques for using such systems in relation to various computer-generated reality technologies are described.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
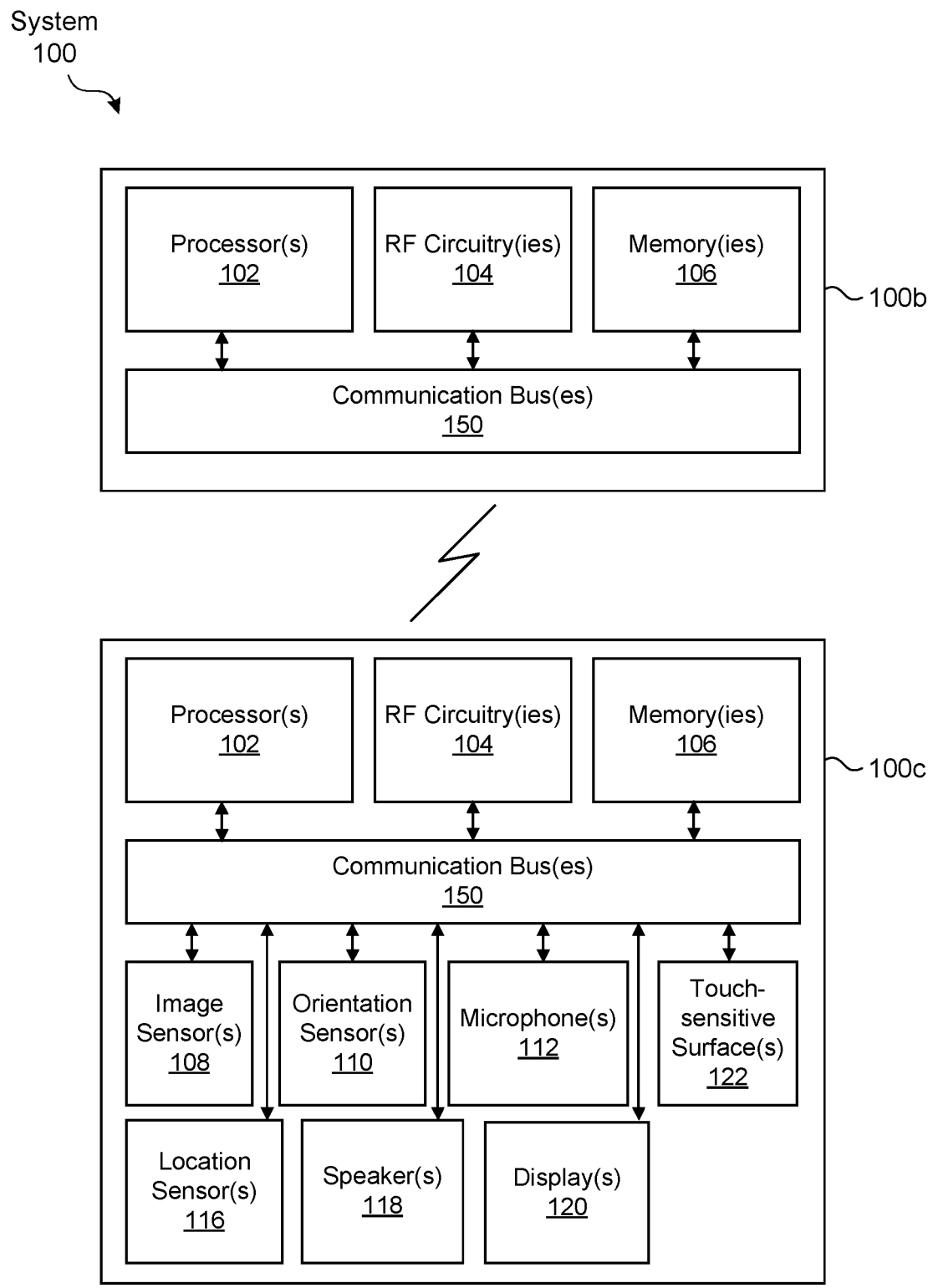

FIG. 1A and FIG. 1B depict exemplary system 100 for use in various computer-generated reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

As used herein, an "installed application" refers to a software application that has been downloaded onto an electronic device (e.g., devices 100*a*, 100*b*, and/or 100*c*) and is ready to be launched (e.g., become opened) on the device. In some examples, a downloaded application becomes an installed application by way of an installation program that extracts program portions from a downloaded package and integrates the extracted portions with the operating system of the computer system.

As used herein, the terms "open application" or "executing application" refer to a software application with retained state information, e.g., in memory(ies) 106. An open or executing application is, optionally, any one of the following types of applications:

- an active application, which is currently displayed on a display screen of the device that the application is being used on (or which is currently being projected by the device that the application is being used on);
- a background application (or background processes), which is not currently displayed (or not currently projected), but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

As used herein, a virtual object is viewpoint-locked when a device displays the virtual object at the same location and/or position in the viewpoint of the user, even as the viewpoint of the user shifts (e.g., changes). In examples where the device is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In examples where the device has a display that can be repositioned with respect to the user's head, the viewpoint of the user is the view that is being presented to the user on the display. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In examples in which the device is a head-mounted device, the viewpoint of the user is locked to the orientation of the user's head, such that the virtual object is also referred to as a "head-locked virtual object."

Figure 2A:
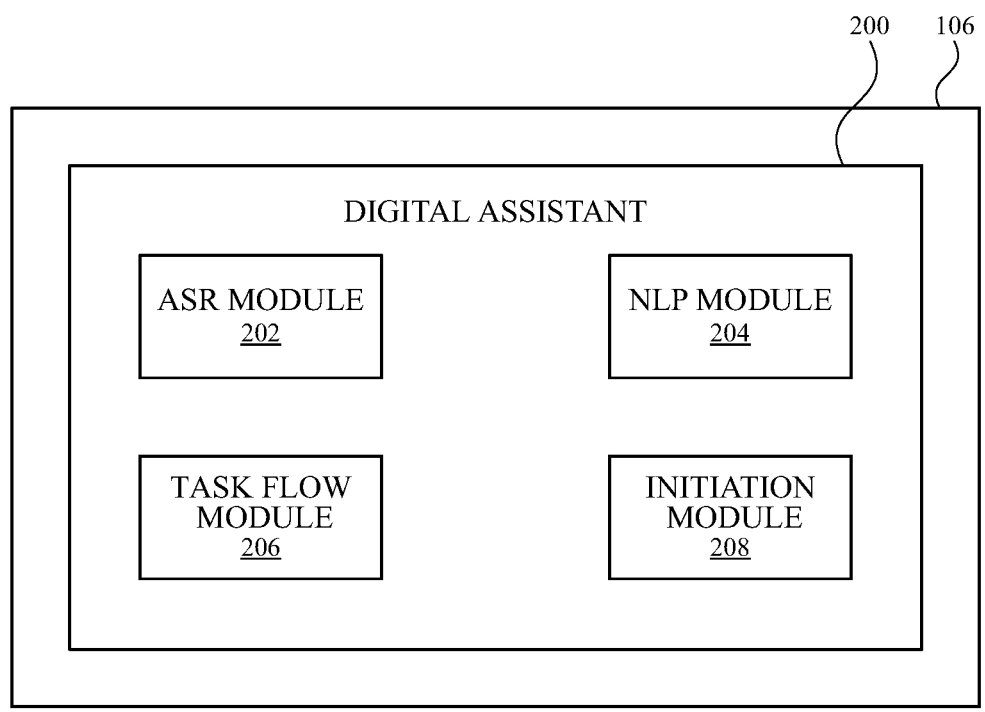
FIG. 2A illustrates an architecture of a digital assistant, according to various examples.

As used herein, a virtual object is environment-locked (alternatively, "world-locked") when a device displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some examples, device uses a stationary frame of reference (e.g., a coordinate system that is anchored to a fixed location and/or object in the physical environment) to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment FIG. 2A illustrates an architecture of digital assistant (DA) 200, according to various examples. In some examples, DA 200 is at least partially implemented (e.g., as computer-executable instructions) stored in memory(ies) 106.

FIG. 2A shows only one example architecture of DA 200, and DA 200 can have more or fewer components than shown, can combine two or more components, or can have a different configuration or arrangement of the components. Further, although the below describes that a single component of DA 200 performs a certain function, another component of DA 200 may perform the function, or the function may be performed by a combination of two or more components.

DA 200 includes automatic speech recognition (ASR) module 202, natural language processing (NLP) module 204, task flow module 206, and initiation module 208.

DA 200 processes natural language input (e.g., in spoken or textual form) to initiate (e.g., perform) a corresponding task for a user. For example, ASR module 202 is configured to perform automatic speech recognition (ASR) on received natural language speech input to obtain candidate textual representation(s). NLP module 204 is configured to perform natural language processing (NLP) on the candidate textual representation(s) to determine corresponding actionable intent(s). An "actionable intent" (or "user intent") represents a task that can be performed by DA 200, and can have an associated task flow implemented in task flow module 206. The associated task flow is a series of programmed actions and steps that DA 200 takes to perform the task.

Figure 2B:
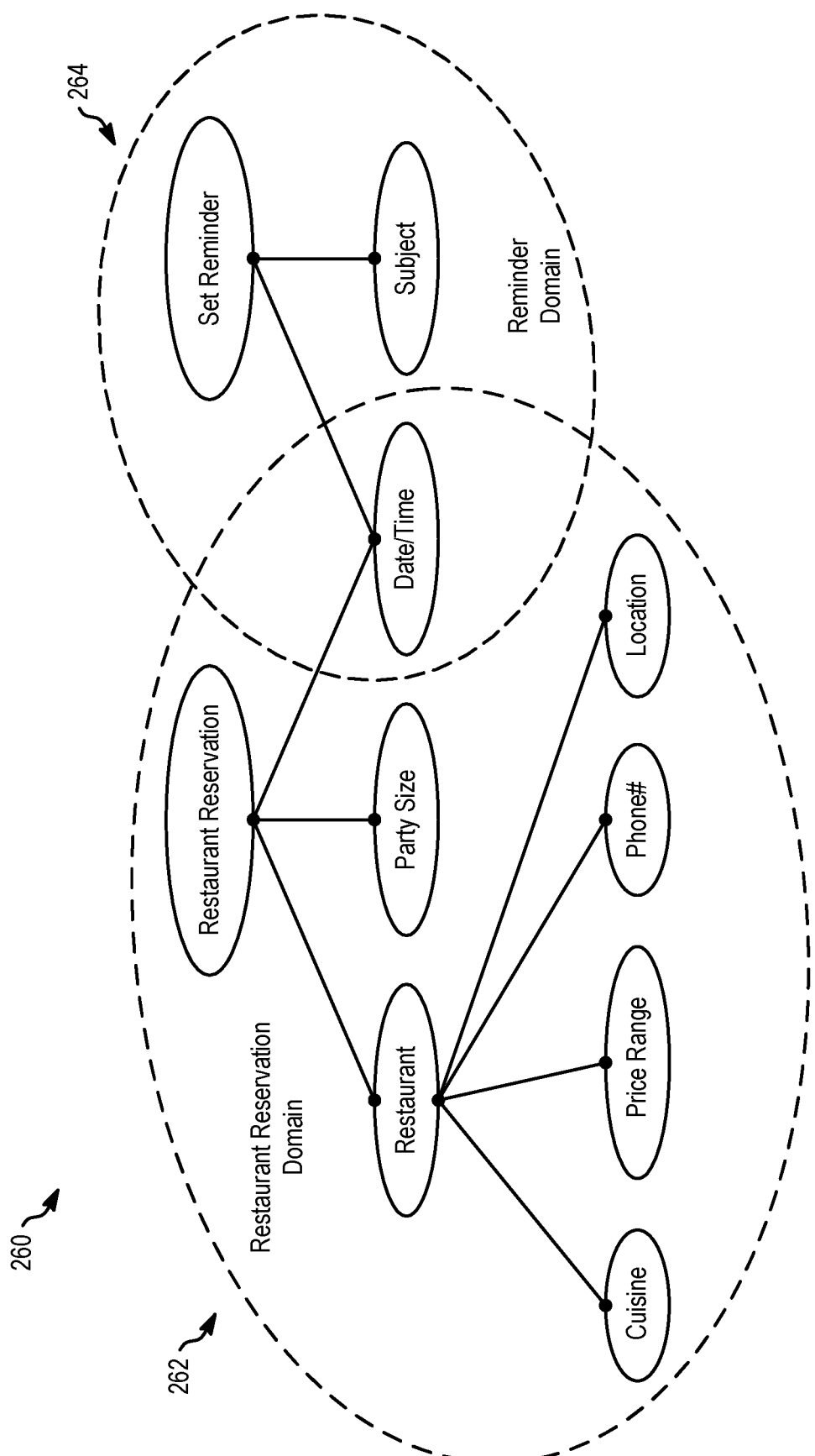
FIG. 2B an ontology for processing natural language input, according to various examples.

FIG. 2B illustrates ontology 260 that NLP module 204 uses to process natural language input, according to various examples. Ontology 260 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 260 defines how a parameter represented by the property node pertains to the task represented by the actionable intent node.

In some examples, ontology 260 is made up of actionable intent nodes and property nodes. Within ontology 260, each actionable intent node is linked to one or more property nodes either directly or through one or more intermediate property nodes. Similarly, each property node is linked to one or more actionable intent nodes either directly or through one or more intermediate property nodes. For example, as shown in FIG. 2B, ontology 260 includes a "restaurant reservation" node (i.e., an actionable intent node). Property nodes "restaurant," "date/time" (for the reservation), and "party size" are each directly linked to the actionable intent node (i.e., the "restaurant reservation" node).

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 2B, ontology 260 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 260.

An actionable intent node, along with its linked property nodes, is described as a "domain." In the present discussion, each domain is associated with a respective actionable intent, and refers to the group of nodes (and the relationships there between) associated with the particular actionable intent. For example, ontology 260 shown in FIG. 2B includes an example of restaurant reservation domain 262 and an example of reminder domain 264 within ontology 260. The restaurant reservation domain includes the actionable intent node "restaurant reservation," property nodes "restaurant," "date/time," and "party size," and sub-property nodes "cuisine," "price range," "phone number," and "location." Reminder domain 264 includes the actionable intent node "set reminder," and property nodes "subject" and "date/time." In some examples, ontology 260 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 262 and reminder domain 264.

While FIG. 2B illustrates two example domains within ontology 260, other domains include, for example, "find a movie," "initiate a phone call," "find directions," "schedule a meeting," "send a message," and "provide an answer to a question," "read a list," "providing navigation instructions," "provide instructions for a task," "provide weather information," and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 260 includes all the domains (and hence actionable intents) that the digital assistant is capable of understanding and acting upon. In some examples, ontology 260 is modified, such as by adding or removing entire domains or nodes, or by modifying relationships between the nodes within the ontology 260.

In some examples, nodes associated with multiple related actionable intents are clustered under a "super domain" in ontology 260. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 260 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in a vocabulary index (e.g., implemented within NLP module 204) in association with the property or actionable intent represented by the node. For example, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index optionally includes words and phrases in different languages.

NLP module 204 receives the candidate textual representation(s) from ASR module 202, and for each candidate representation, determines what nodes are implicated by the words in the candidate text representation. In some examples, if a word or phrase in the candidate text representation is found to be associated with one or more nodes in ontology 260 (via the vocabulary index), the word or phrase "triggers" or "activates" those nodes. Based on the quantity and/or relative importance of the activated nodes, NLP module 204 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

In some examples, NLP module 204 is implemented using one or more machine learning mechanisms (e.g., neural networks). In particular, the one or more machine learning mechanisms are configured to receive a candidate text representation, and optionally, associated context information (discussed below). Based on the candidate text representation, and optionally, the associated context information, the one or more machine learning mechanisms are configured to determine intent confidence scores over a set of candidate actionable intents. NLP module 204 can select one or more candidate actionable intents from the set of candidate actionable intents based on the determined intent confidence scores. In some examples, an ontology (e.g., ontology 260) is also used to select the one or more candidate actionable intents from the set of candidate actionable intents.

In some examples, once NLP module 204 determines an actionable intent, task flow module 206 causes execution of the corresponding task flow to provide an output to satisfy the user intent. It will be appreciated that the number of actionable intents (and corresponding task flows) recognized by DA 200 can define the scope of the DA's capabilities. Example DAs include Siri by Apple Inc., Alexa by Amazon.com, Inc., Google Assistant by Google LLC, Cortana by Microsoft Corp, and Bixby by Samsung Electronics Co., Ltd.

DA 200 includes initiation module 208. Initiation module 208 is configured to determine whether a natural language input is intended for DA 200, e.g., based on other received input(s). In some examples, a session of DA 200 initiates and/or DA 200 processes the natural language input, responsive to initiation module 208 determining that the natural language input is intended for DA 200. Examples of inputs indicating that natural language input is intended for DA 200 include a spoken trigger input (e.g., "Hey Assistant"), input pressing a button, input selecting a displayed icon, predetermined types of gesture input, gaze input (e.g., indicating gaze at an icon), and the like. Further details about determining whether a natural language input is intended for DA 200 are discussed with respect to FIGS. 3A-3L, 4A-4F, and 5A-5B below.

FIGS. 3A-3L illustrate a user's current view of environment 300 (e.g., an XR environment) using device 302. Device 302 is implemented as device 100a or 100c. In some examples, device 302 is a head mounted device, e.g., a headset, eyeglasses, lenses designed for placement on the user's eyes, and the like. In other examples, device 302 is another type of electronic device such as a smart phone, a tablet device, a laptop computer, or a projection-based device.

In some examples, device 302 displays the current view of environment 300 shown in FIGS. 3A-3L. For example, environment 300 is a virtual environment or device 302 displays the current view using pass-through video of a physical environment.

In other examples, at least a portion of the current view shown in FIGS. 3A-3L is directly viewed by the user. For example, the user views environment 300 (e.g., a physical environment) directly via a transparent or translucent display of device 302. In such examples, device 302 can superimpose (e.g., display) virtual elements over the user's current view of environment 300. As another example, device 302 is a projection-based device and the user views environment 300 directly without using a display and views virtual objects projected by device 302 into environment 300. Accordingly, while the below discusses device 302 displaying various virtual objects, it will be appreciated that device 302 can project the virtual objects onto environment 300 in an analogous manner.

Figure 3A:
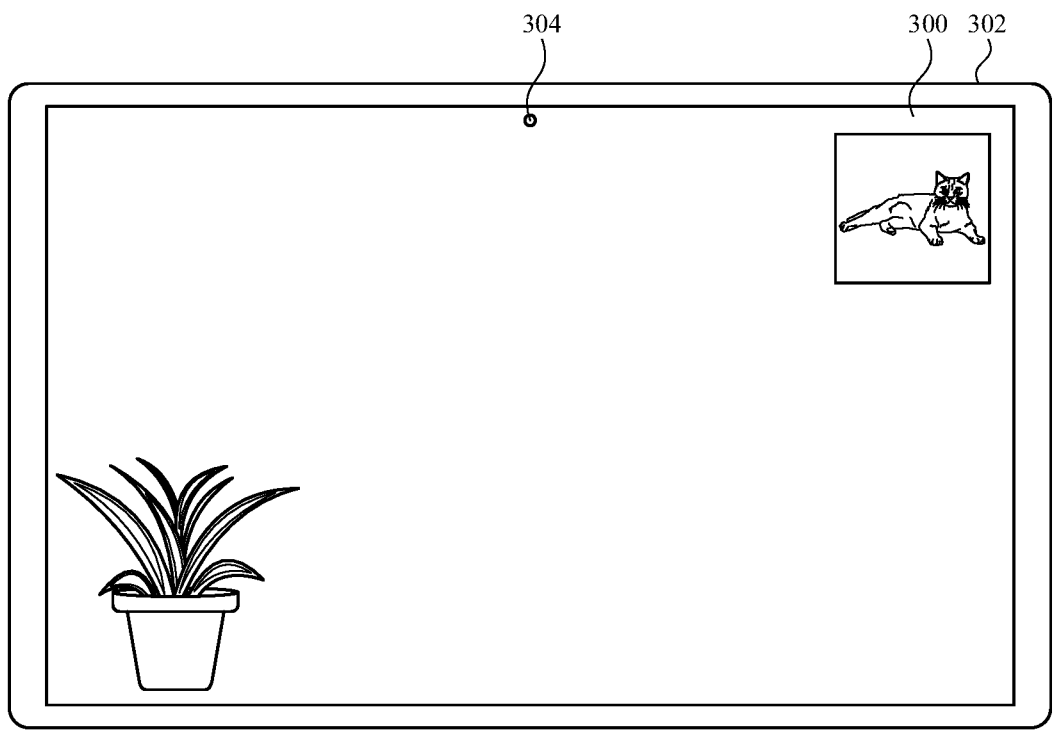
FIGS. 3A-3L illustrate a user's current view of an environment using a device.

In FIG. 3A, the current view includes first object 304, a virtual object. In some examples, first object 304 is persistent in the current field of view of environment 300, e.g., persistent until device 302 receives user input to cease display of first object 304. For example, first object 304 is a viewpoint-locked virtual object.

Device 302 detects a user gaze at first object 304. For example, device 302 detects the user gaze using sensor(s), e.g., image sensor(s) 108 configured to detect a user's gaze. In some examples, detecting the user gaze at first object 304 includes determining that the user gaze is directed at first object 304 for a predetermined duration, e.g., 0.1 seconds, 0.25 seconds, 0.5 seconds, or 1 second.

Figure 3B:
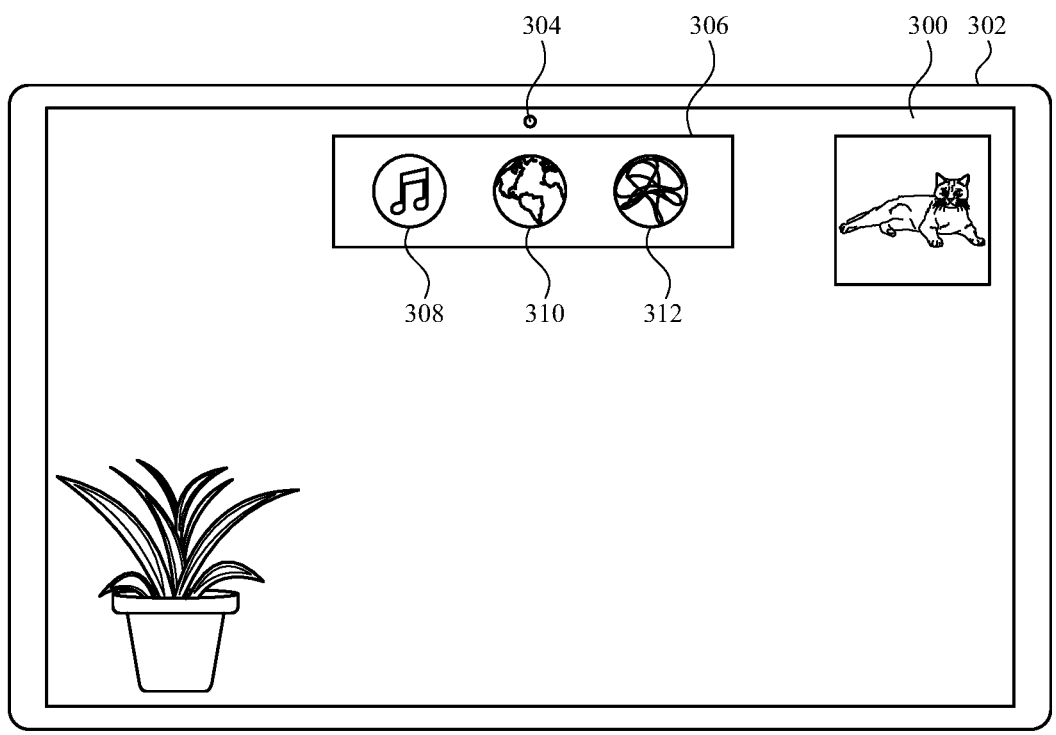

In FIG. 3B, in response to detecting the user gaze at first object 304, device 302 expands first object 304 into list 306 (a virtual object) of objects. For example, device 302 displays list 306 within a predetermined distance from first object 304. In some examples, list 306 is a viewpoint-locked virtual object. In some examples, expanding first object 304 into list 306 includes concurrently displaying first object 304 and list 306, as shown in FIG. 3B. In other examples, expanding first object 304 into list 306 includes ceasing to display first object 304 and displaying list 306.

In some examples, list 306 includes one or more user selectable objects, e.g., music icon 308, web browser icon 310, and second object 312 representing a digital assistant, e.g., DA 200. The user can provide inputs (e.g., touch input, gaze input, speech input, gesture input) respectively corresponding to selections of music icon 308 and to web browser 310 to cause device 302 to display, respectively, a music application user interface and a web browser application user interface.

In some examples, expanding first object 304 into list 306 includes displaying an animation of second object 312. For example, upon initial display of second object 312 in list 306, device 302 displays the animation of second object 312, e.g., to indicate that the user can provide input to initiate a DA session. In some examples, the animation changes the size of second object 312, changes a color of second object 312, moves second object 312 within list 306, and/or otherwise modifies the display manner of second object 312.

In some examples, device 302 detects a user gaze at second object 312. In some examples, detecting the user gaze at second object 312 includes determining that the user gaze is directed at second object 312 for a predetermined duration, e.g., 0.1 seconds, 0.25 seconds, 0.5 seconds, or 1 second.

Figure 3C:
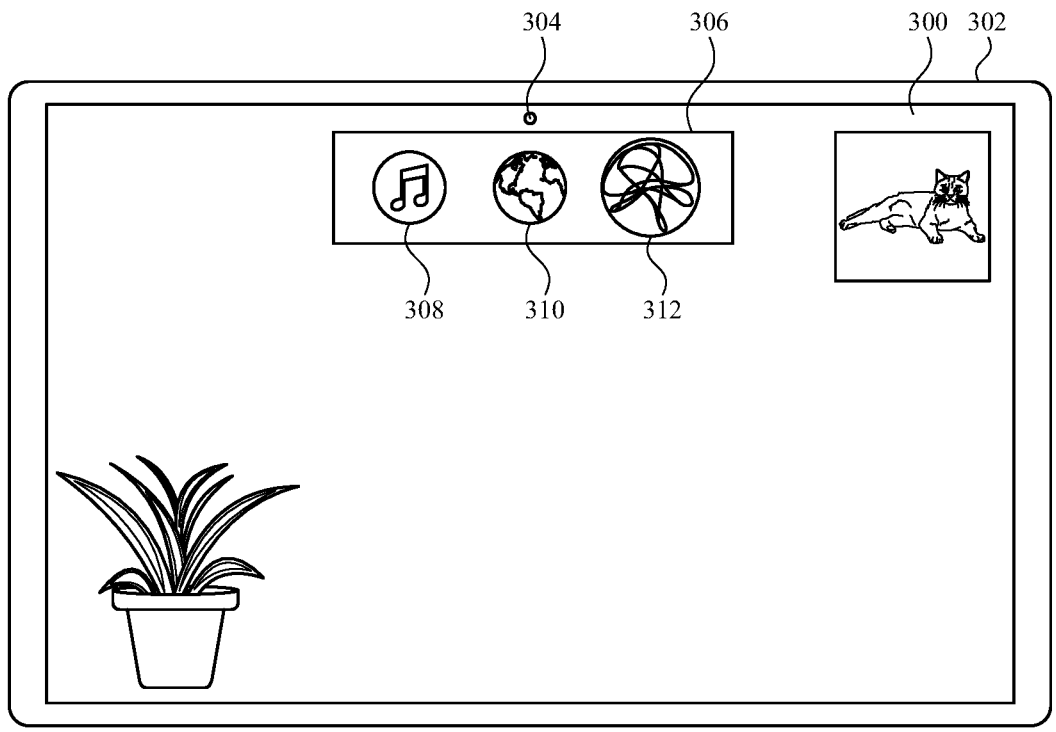

Turning to FIG. 3C, in accordance with detecting the user gaze at second object 312, device 302 initiates a DA session. In some examples, initiating a DA session includes initiating (e.g., starting to execute) certain computing processes of the DA, e.g., processes configured to listen for and to detect an endpoint of a speech input, processes configured to perform ASR on the speech input, processes configured to perform NLP on the speech input, processes configured to cause device 302 to output DA results, processes configured to cause device 302 to display elements associated with the DA, or a combination or sub-combination thereof. In some examples, dismissing the DA session includes ceasing to execute such processes, ceasing to display second object 312, and/or ceasing to display second object 312 outside of list 306. In some examples, other processes of the DA are active (e.g., executing) when the DA session is dismissed. For example, a process configured to detect spoken triggers for initiating the DA session (e.g., "Hey Assistant" or "Assistant") is active when the DA session is dismissed.

In some examples, when a DA session is initiated, the DA is an active application. For example, the DA session is initiated when second object 312 is displayed, or when second object 312 is displayed at a predetermined location, e.g., displayed outside of the indicated boundary of list 306. In some examples, when the DA session is dismissed, the DA is a background application.

Figure 3D:
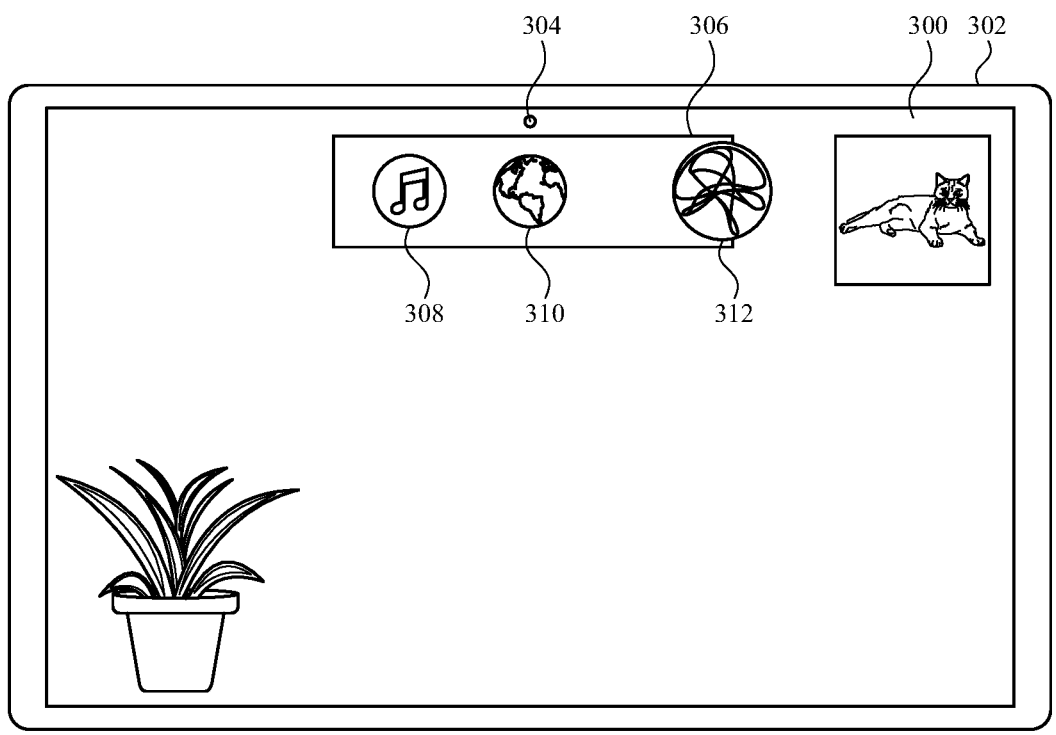
Figure 3E:
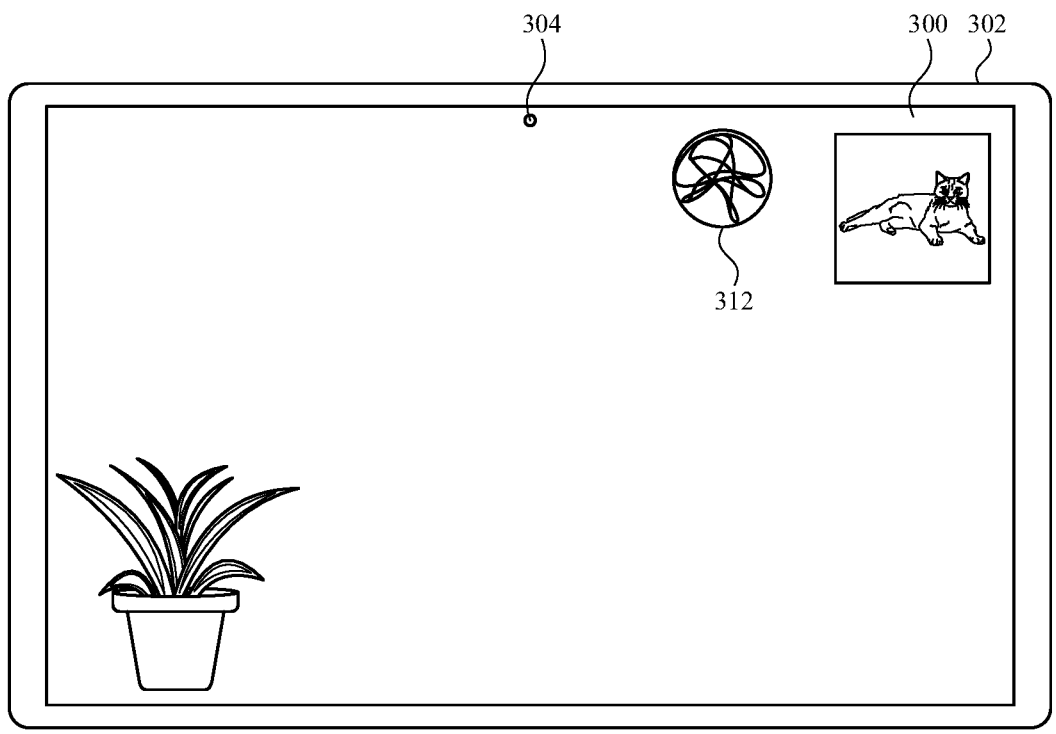

In some examples, initiating the DA session includes displaying an animation of second object 312 indicating that the DA session is initiated (initiation animation). In some examples, displaying the initiation animation includes displaying a change in a shape, a size (e.g., larger size), and/or a color of second object 312. In some examples, displaying the initiation animation includes moving second object 312 away from list 306. In some examples, displaying the initiation animation includes ceasing to display list 306. For example, the initiation animation includes shrinking the display size of list 306 until list 306 ceases to be displayed. FIGS. 3C-3E show an example initiation animation of second object 312. In particular, second object 312 increases in size, moves away from list 306, and list 306 ceases to be displayed.

In some examples, device 302 receives an audio input. In some examples, the audio input includes a user request to the DA, e.g., "what's the weather like in Palo Alto?". In some examples, device 302 displays a first portion of the initiation animation of second object 312 (e.g., a change in shape, size, or color) responsive to detecting user gaze at second object 312. In some examples, device 302 displays a second portion of the initiation animation (e.g., moving second object 312 away from list 306 and ceasing to display list 306) responsive to receiving the audio input. In this manner, a user can first gaze at second object 312 to cause second object 312 to increase in size and then begin speaking to cause second object 312 to move away from list 306.

In some examples, displaying the initiation animation of second object 312 (or displaying the second portion thereof) includes determining, based on user gaze at second object 312, that the audio input is intended for the DA. For example, device 302 (e.g., using initiation module 208) analyzes the relative timing of the audio input and the detected user gaze at second object 312. For example, device 302 determines that the audio input is intended for the DA if user gaze at second object 312 is detected within a predetermined time window around the start time of the audio input, if user gaze at second object 312 is detected while receiving the audio input (or a portion thereof), and/or if user gaze at second object 312 is detected within a second predetermined time window around the end time of the audio input.

Figure 3F:
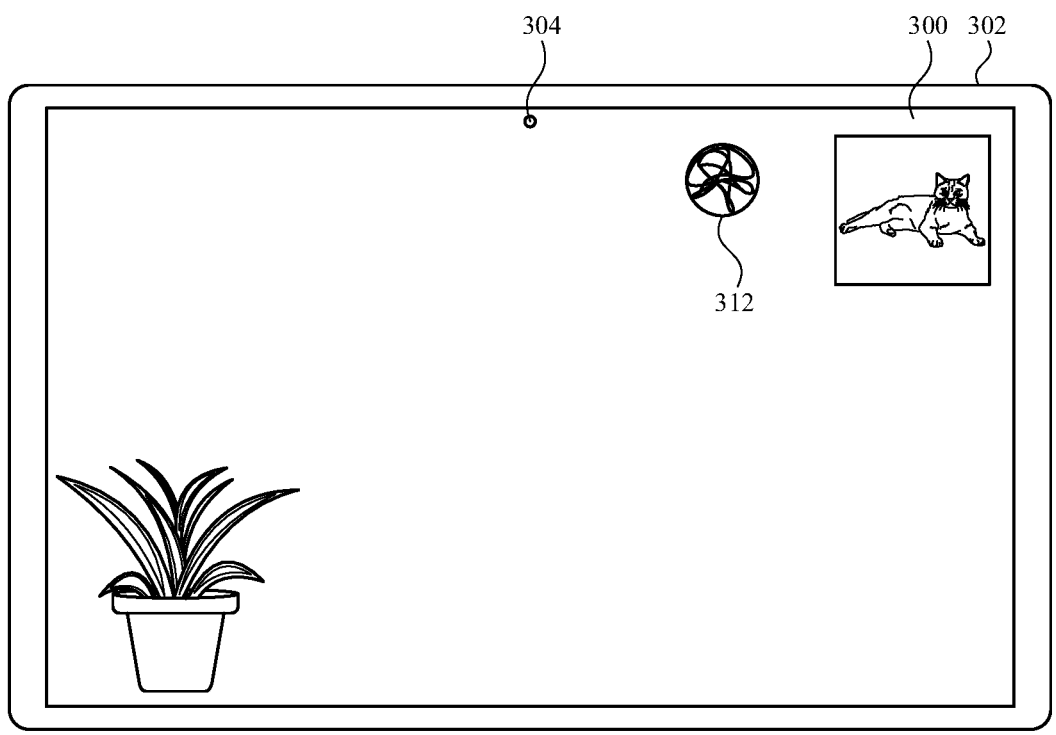

Turning to FIG. 3F, in some examples, device 302 displays an animation of second object 312 indicating that the DA is actively listening to the user (listening animation) in response to receiving the audio input. In some examples, displaying the listening animation includes expanding and shrinking a size of second object 312 responsive to the audio input. For example, device 302 expands and shrinks second object 312 based on variation(s) in respective feature(s) of the audio input, e.g., variations in amplitude, pitch, tone, frequency, and the like. In FIG. 3F, for instance, the size of second object 312 shrinks relative to FIG. 3E based on variations in feature(s) of the audio input "what's the weather like in Palo Alto?".

In some examples, device 302 concurrently displays a least a portion of the initiation animation with at least a portion of the listening animation. For example, if device 302 receives audio input before the initiation animation completes, device 302 expands or shrinks the size of second object 312 responsive to the audio input while moving second object 312 away from list 306.

While the above describes using gaze input and/or audio input to initiate the DA session (e.g., display the initiation animation), in some examples, device 302 uses other inputs to initiate the DA session. For example, in FIG. 3B, while displaying list 306, device 302 receives a hand gesture (e.g., a pointing gesture, a pinching gesture, a grabbing gesture, and the like) corresponding to a selection of second object 312. For example, device 302 detects the hand gesture using image sensor(s) 108. In response to receiving the hand gesture, device 302 initiates the DA session, e.g., displays the initiation animation of second object 312, as shown in FIGS. 3D-3E.

As another example, device 302 receives an audio input including a spoken trigger (e.g., "Hey Assistant" or "Assistant") for initiating a DA session. In response to receiving the audio input, device 302 initiates the DA session, e.g., displays the initiation animation of second object 312, as shown in FIGS. 3D-3E. In some examples, if device 302 does not display list 306 when the spoken trigger is received, device 302 displays an initiation animation of second object 312 analogous to that shown in FIGS. 3D-3E. For example, the initiation animation includes second object 312 appearing to emerge from first object 304 (e.g., by gradually increasing the size of second object 312) and second object 312 moving away from first object 304.

In some examples, when device 302 displays second object 312 outside of list 306, device 302 modifies the display of environment 300 such that second object 312 appears to cast light on environment 300 in a physically realistic manner. For example, device 302 displays environment 300 (e.g., to include shadows, to include portions having varying brightness, to include reflections of light) to simulate second object 312 as a light source. In some examples, device 302 outputs DA generated audio (e.g., responses to user requests) so the audio appears to originate from the location of second object 312, e.g., using 3-dimensional audio processing techniques. In some examples, when device 302 displays second object 312 outside of list 306, device 302 displays second object 312 to appear a predetermined distance (e.g., 0.25 meters, 0.5 meters, 1 meter) from the user and/or from first object 304. For example, the initiation animation moves the display of second object 312 from within list 306 to outside of list 306 and to appear a predetermined distance from the user.

Figure 3G:
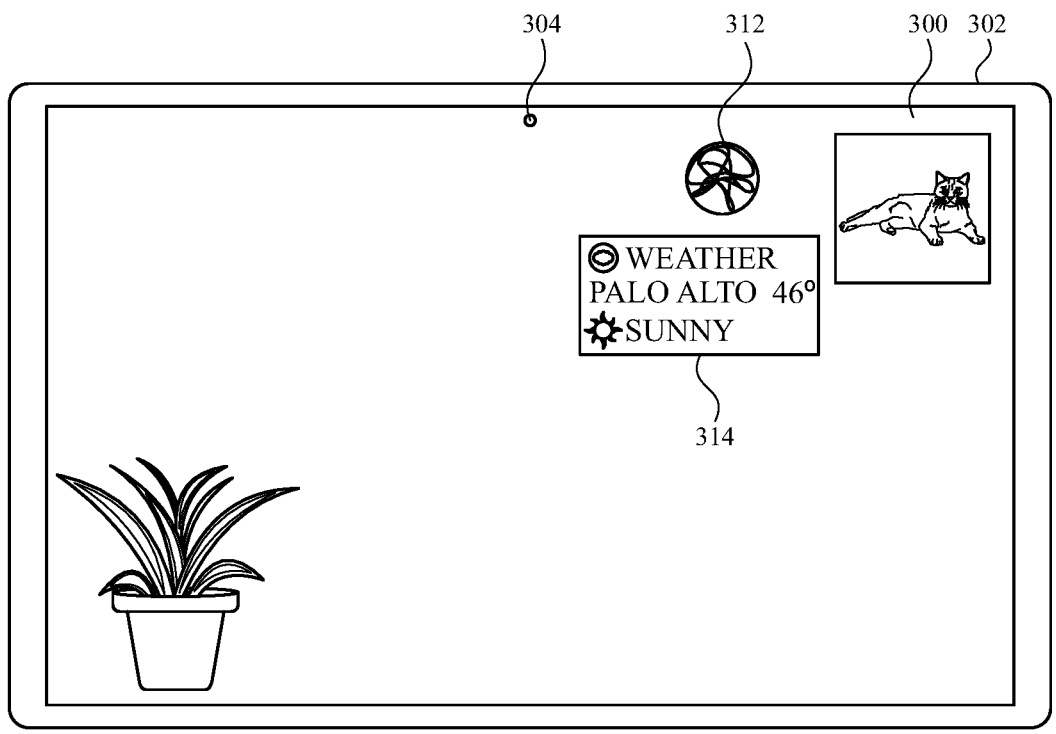

Turning to FIG. 3G, in some examples, device 302 displays virtual object 314 in response to receiving the audio input, e.g., "what's the weather like in Palo Alto?". Virtual object 314 corresponds to a response, by the DA, to the audio input. For example, the DA processes the audio input to determine the requested weather information and causes device 302 to display virtual object 314 indicating the requested weather information.

In some examples, virtual object 314 is displayed below second object 312. In some examples, virtual object 314 is positioned within a predetermined distance (e.g., 0.1 meters, 0.25 meters, 0.5 meters) from (e.g., to the side of, above, below, behind of, or in front of) second object 312.

In some examples, virtual object 314 and second object 312 are persistent in the current field of view. For example, virtual object 314 and second object 312 are viewpoint-locked virtual objects. As a specific example, the respective positions of virtual object 314 and second object 312 are anchored to the position of a viewpoint-locked virtual object, e.g., first object 304.

Figure 3H:
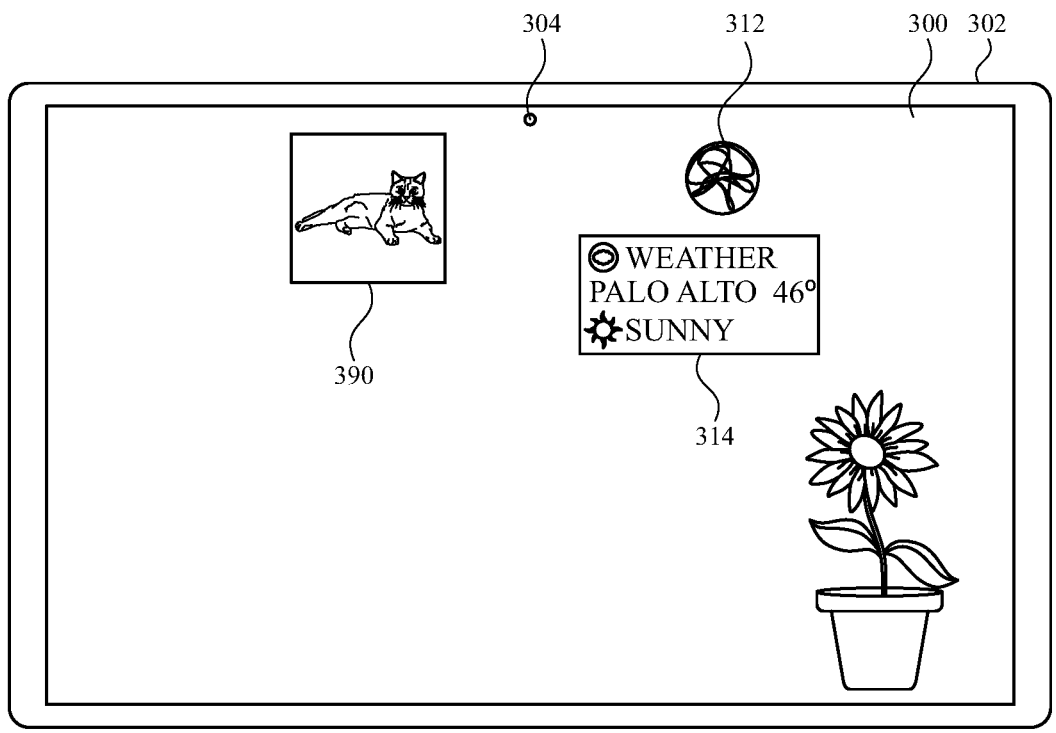

FIG. 3H shows an example where virtual object 314 and second object 312 are viewpoint-locked. In FIG. 3H, the user has moved rightward from FIG. 3G, thus causing the current view to adjust accordingly. Virtual object 314 and second object 312 are displayed at the same location in the current views of FIGS. 3G and 3H.

In some examples, second object 312 is persistent in the current view, while virtual object 314 is positioned at a fixed location in environment 300 (e.g., its initial display location). For example, second object 312 is viewpoint-locked, while virtual object 314 is environment-locked. For example, rather than being displayed to the right of picture 390 in FIG. 3H, virtual object 314 would remain displayed to the left of picture 390 when the user moves rightward. But second object 312 would be displayed at its location shown in FIG. 3H when the user moves rightward.

In some examples, second object 312 and virtual object 314 are each positioned at respective fixed locations in environment 300, e.g., their respective locations in FIG. 3G. For example, both second object 312 and virtual object 314 are environment-locked. For example, rather than being displayed to the right of picture 390 in FIG. 3H, both second object 312 and virtual object 314 would remain displayed to the left of picture 390 when the user moves rightward.

Figure 3I:
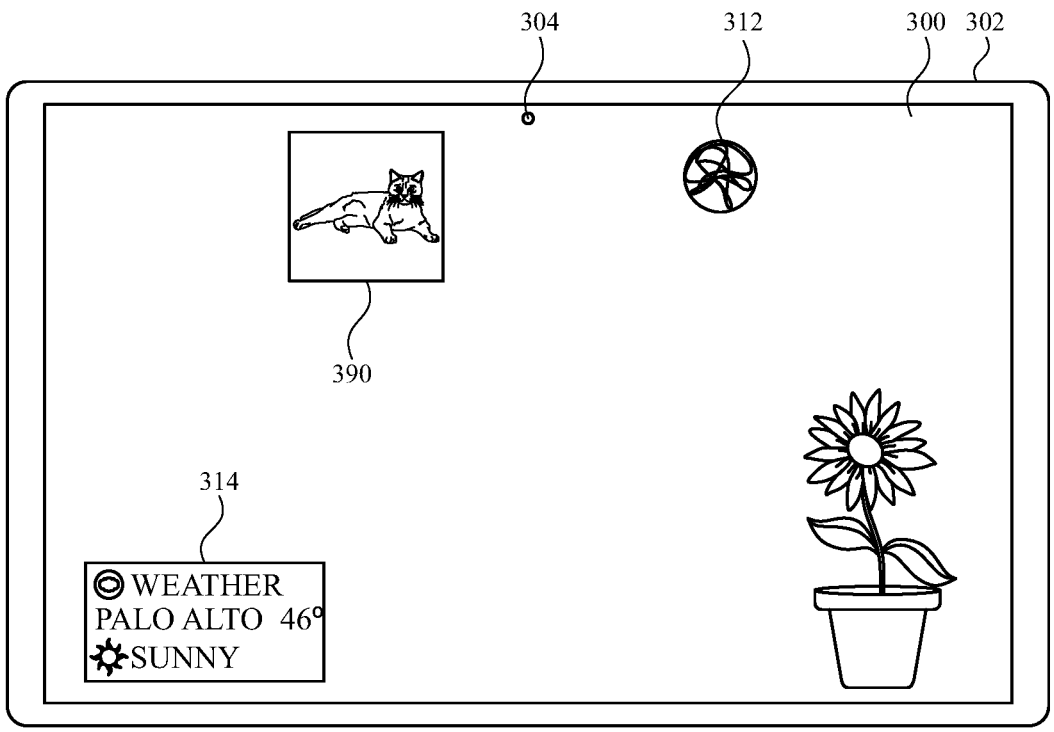

Turning to FIG. 3I, in some examples, device 302 receives a request to interact with virtual object 314. The request includes a gesture input, a speech input, a touch input, or a gaze input. In some examples, the request corresponds to moving virtual object 314 (e.g., moving the display of virtual object 314) from an initial location (e.g., virtual object 314's location in FIG. 3H) to a destination location (e.g., virtual object 314's location in FIG. 3I). For example, in FIG. 3I, the user has provided a dragging gesture to move virtual object 314 to the bottom left portion of the user's current view.

Figure 3J:
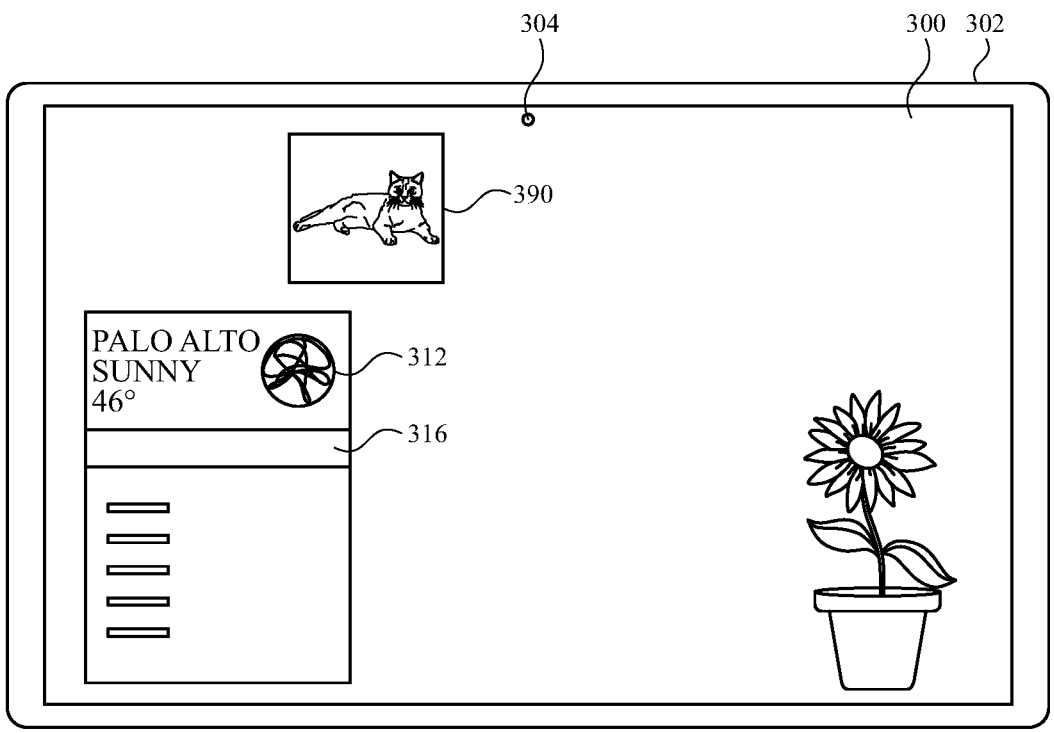

Turning to FIG. 3J, in some examples, in response to receiving the request, device 302 expands virtual object 314 into user interface 316 of a corresponding application. For example, device 302 displays user interface 316 at the destination location and ceases to display virtual object 314. In some examples, displaying user interface 316 includes launching the corresponding application or displaying user interface 316 in the foreground, e.g., if the corresponding application was previously a background application. In some examples, user interface 316 includes more detailed information than virtual object 314. For example, virtual object 314 includes current weather information for Palo Alto, California, while user interface 316 includes current, hourly, and weekly weather information for Palo Alto, California.

In some examples, device 302 expands virtual object 314 into user interface 316 in accordance with determining that the destination location is not of a predetermined type. Example predetermined types of destination locations include locations within displayed user interfaces of applications and locations occupied by visible objects (e.g., virtual or physical objects within the current view). In some examples, in accordance with determining that the destination location is of the predetermined type, device 302 displays virtual object 314 at the destination location, but does not expand virtual object 314 into user interface 316. In some examples, in accordance with determining that the destination location is of the predetermined type, device 302 provides an output (e.g., audio output and/or displayed output) indicative of an error, e.g., "sorry, I can't put that there." In this manner, virtual object 314 can expand into user interface 316 if moved to locations not of the predetermined type, e.g., empty space not occupied by a visible object or by a visible user interface.

In some examples, device 302 expands virtual object 314 into user interface 316 in accordance with a determination that virtual object 314 corresponds to a predetermined type of application. Example predetermined types of applications include a weather application, a messaging application, a media player (e.g., music) application, a payment application, and an application for controlling smart home appliances. In some examples, in response to receiving the request to interact with virtual object 314 and in accordance with a determination that virtual object 314 does not correspond to the predetermined type of application, device 302 forgoes expanding virtual object 314 into user interface 316. Instead, device 302 displays virtual object 314 at the destination location. Accordingly, virtual object 314 may expand into user interface 316 (e.g., when moved to empty space) if the corresponding application is of a predetermined type.

FIG. 3J shows that device 302 displays second object 312 while displaying user interface 316. In some examples, expanding virtual object 314 into user interface 316 includes moving the display of second object 312 from an initial location (e.g., in FIG. 3I) to a location within user interface 316, as shown in FIG. 3J. In other examples, expanding virtual object 314 into user interface 316 does not include moving the display of second object 312. For example, second object 312 remains displayed at its location in FIG. 3H responsive to the request to interact with virtual object 314.

In some examples, the user can control the application using second object 312. For example, the user can gaze at second object 312, provide audio input, speak a trigger phrase for initiating a DA session, and/or provide a hand gesture (e.g., pinching gesture) selecting second object 312. For example, in accordance with receiving such inputs(s), device 302 causes the DA to enter a listening mode, e.g., similarly to how device 302 uses such input(s) to initiate a DA session as discussed with respect to FIGS. 3C-3E. When in the listening mode, a microphone is activated to sample for spoken user requests, e.g., user requests to control the application. For example, the user can provide the user request "what about in Paris?" to cause the weather application to provide weather information for Paris, France.

While various examples herein describe receiving an input (e.g., audio input including a spoken trigger, gaze input, gesture input, input selecting a button of device 302) to cause the DA to enter a listening mode, in other examples, the DA is in a listening mode whenever a DA session is initiated, e.g., when second object 312 is displayed outside the boundary of list 306. In such examples, initiation module 208 processes audio input sampled by the activated microphone to determine whether the audio input is intended for the DA, e.g., based on feature(s) (e.g., acoustic feature(s), semantic feature(s), and/or syntactic feature(s)) of the audio input and/or based on other inputs (e.g., gaze input, gesture input, audio input including a spoken trigger, and/or input selecting a button of device 302). In accordance with a determination that the audio input is intended for the DA, the DA initiates a task based on the audio input and provides an output indicating the initiated task. In accordance with a determination that the audio input is not intended for the DA, the DA ignores the audio input, e.g., forgoes initiating a task based on the audio input and/or forgoes providing output indicating any initiated task. Accordingly, when the DA is in the listening mode, the user is not required to provide input(s) other than the audio input to cause the DA to initiate a requested task, although the DA can use such other input(s) to adjust a confidence that the audio input is intended for the DA.

In some examples, the DA interprets user requests using context information associated with the application. For example, the DA interprets user requests using the context information when second object 312 is displayed in user interface 316, or when second object 312 is displayed within a predetermined volume (e.g., space) around user interface 316. In some examples, the context information includes a domain associated with the application. For example, in FIG. 3J, the DA interprets the user request "what about Paris?" using a "provide weather information" domain, e.g., interprets the request to mean asking about weather information in Paris. As another example, suppose user interface 316 corresponds to a messaging application. In such example, when second object 312 is displayed in user interface 316, the DA interprets a user request specifying a person's name using a "send a message" domain, e.g., interprets the request to mean sending a message to the specified person.

Figure 3K:
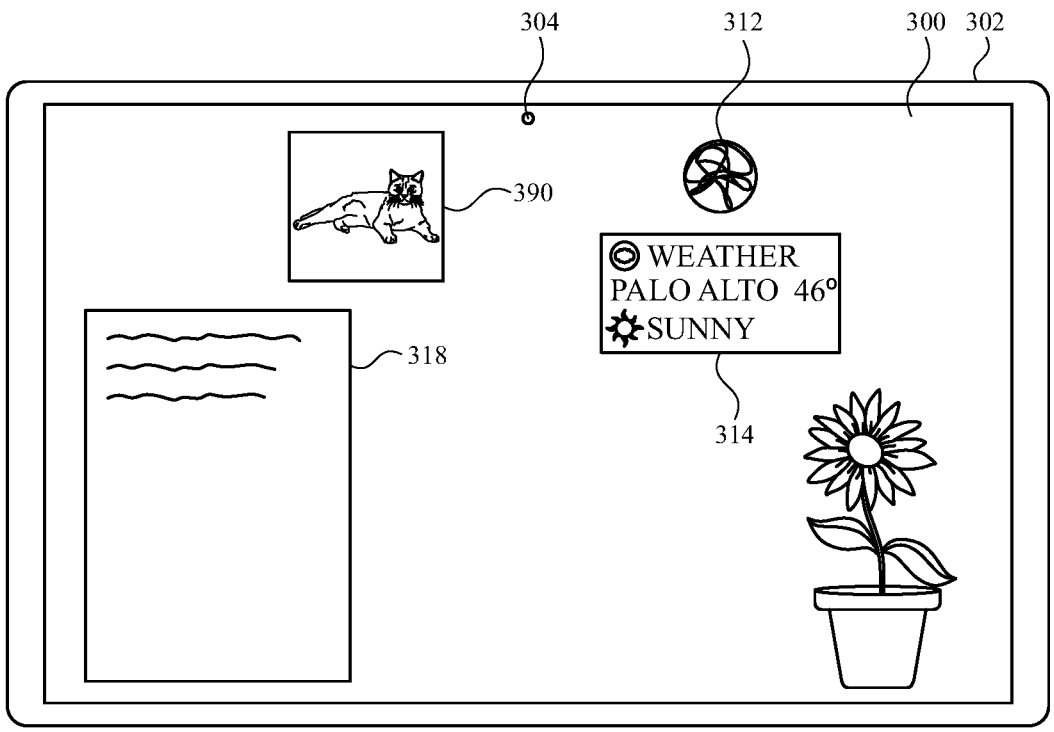
Figure 3L:
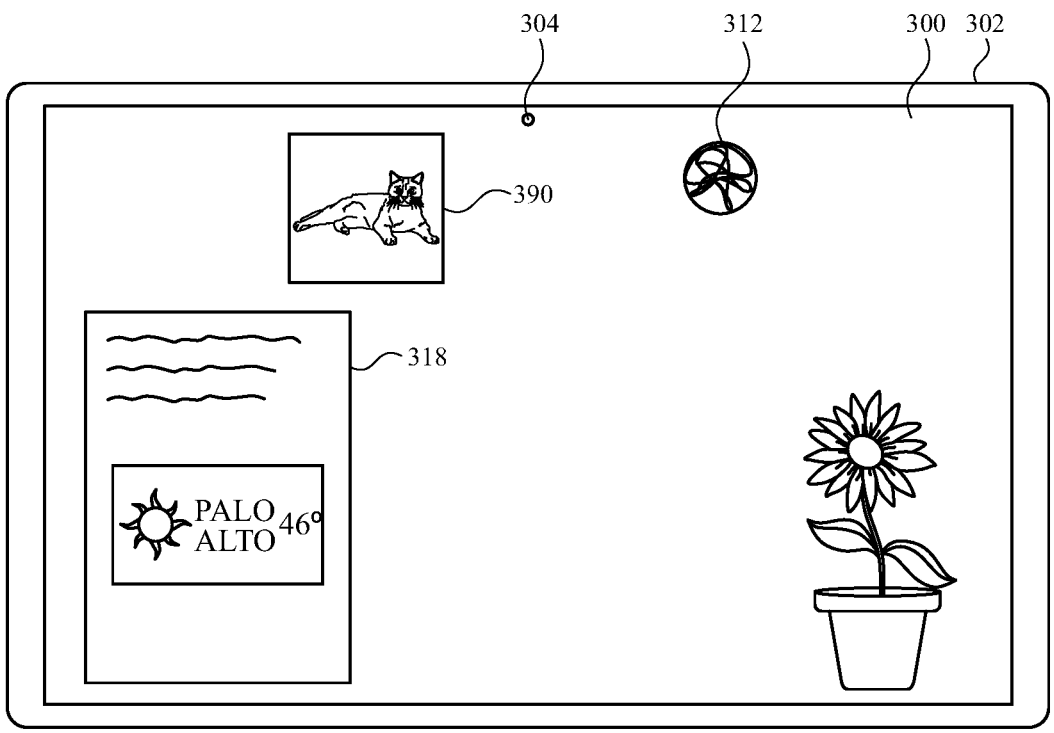

Turning to FIG. 3K, and continuing from FIG. 3H, device 302 displays user interface 318 of a second application, e.g., a word processing application. For example, device 302 received user input instructing to display user interface 318. In some examples, device 302 receives a request to integrate virtual object 314 into the second application. In some examples, the request includes an input (e.g., gesture input, touch input, gaze input, or speech input) to move virtual object 314 into user interface 318. In response to receiving the request, device 302 integrates virtual object 314 into the second application. For example, device 302 displays a content of virtual object 314 within user interface 318. In some examples, device 302 further ceases to display virtual object 314. For example, in FIG. 3L, in response to receiving the request to integrate virtual object 314 into the world processing application, device 302 displays the weather information for Palo Alto, California within user interface 318.

In some examples, while device 302 displays the content of virtual object 314 within user interface 318, device 302 displays second object 312 inside of user interface 318 (or within a predetermined space around user interface 318). For example, in response to receiving input to move virtual object 314 into user interface 318, device 302 moves the display of second object 312 to be within user interface 318 (or to be within a predetermined space around user interface 318). In some examples, while device 302 displays the content of virtual object 314 within user interface 318, device 302 displays second object 312 outside of user interface 318. For example, in response to receiving input to move virtual object 314 into user interface 318, device 302 does not move the display of second object 312.

In some examples, the user can control the second application using second object 312 by providing input(s), e.g., gaze input, audio input, spoken trigger input, gesture input. For example, as discussed above, in accordance with receiving such input(s), the DA enters the listening mode. In some examples, when device 302 displays second object 312 within user interface 318 (or within the predetermined space), the DA interprets user requests using context information associated with the second application, e.g., a domain associated with the second application. For example, the DA interprets the spoken request "remove the weather information" using an "edit document" domain to mean removing the weather information from the word processing document.

In some examples, device 302 ceases to display second object 312. In some examples, ceasing to display second object 312 includes dismissing the DA session. In some examples, first object 304 remains displayed when second object 312 ceases to be displayed. For example, first object 304 remains displayed to allow user input (e.g., gaze input) to re-display second object 312, as discussed with respect to FIGS. 3A and 3B. In some examples, virtual object 314 ceases to be displayed when second object 312 ceases to be displayed.

In some examples, device 302 ceases to display second object 312 a predetermined duration (e.g., 15 seconds, 30 seconds, 1 minute) after displaying virtual object 314 or after displaying second object 312. In some examples, device 302 ceases to display second object 312 a predetermined duration (e.g., 15 seconds, 30 seconds, 1 minute) after receiving the audio input, e.g., "what's the weather like in Palo Alto?". In some examples, device 302 ceases to display second object 312 in accordance with a determination that one or more DA dismissal criteria are satisfied. In some examples, satisfying the DA dismissal criteria includes determining that the user's attention is not directed to virtual object 314 for at least a predetermined duration (e.g., 15 seconds, 30 seconds, 1 minute)) after initially displaying virtual object 314. In some examples, determining that the user's attention is not directed to virtual object 314 includes determining that a user gaze at virtual object 314 is not detected within the predetermined duration or determining that device 302 does not receive input (e.g., gesture input, speech input, or touch input) to interact with virtual object 314 within the predetermined duration. In some examples, satisfying the DA dismissal criteria includes determining that device 302 receives a gesture input (e.g., a hand gesture) to interact with a user interface element in environment 300, where the user interface element does not correspond to the DA. For example, in FIGS. 3K and 3L, in accordance with receiving a gesture input selecting an object (e.g., picture 390) other than second object 312 and virtual object 314, device 302 dismisses the DA session.

FIGS. 4A-4F illustrate a user's current view of environment 400 (e.g., an XR environment) using device 302. In some examples, device 302 displays the current view of environment 400 shown in FIGS. 4A-4F. For example, environment 400 is a virtual environment or device 302 displays the current view using pass-through video of a physical environment.

In other examples, at least a portion of the current view in FIGS. 4A-4F is directly viewed by the user. For example, the user views environment 400 (e.g., a physical environment) directly via a transparent or translucent display of device 302. In such examples, device 302 can superimpose (e.g., display) virtual elements over the user's current view of environment 400. As another example, device 302 is a projection-based device and the user views environment 400 directly without using a display and views virtual objects projected by device 302 onto environment 400.

Figure 4A:
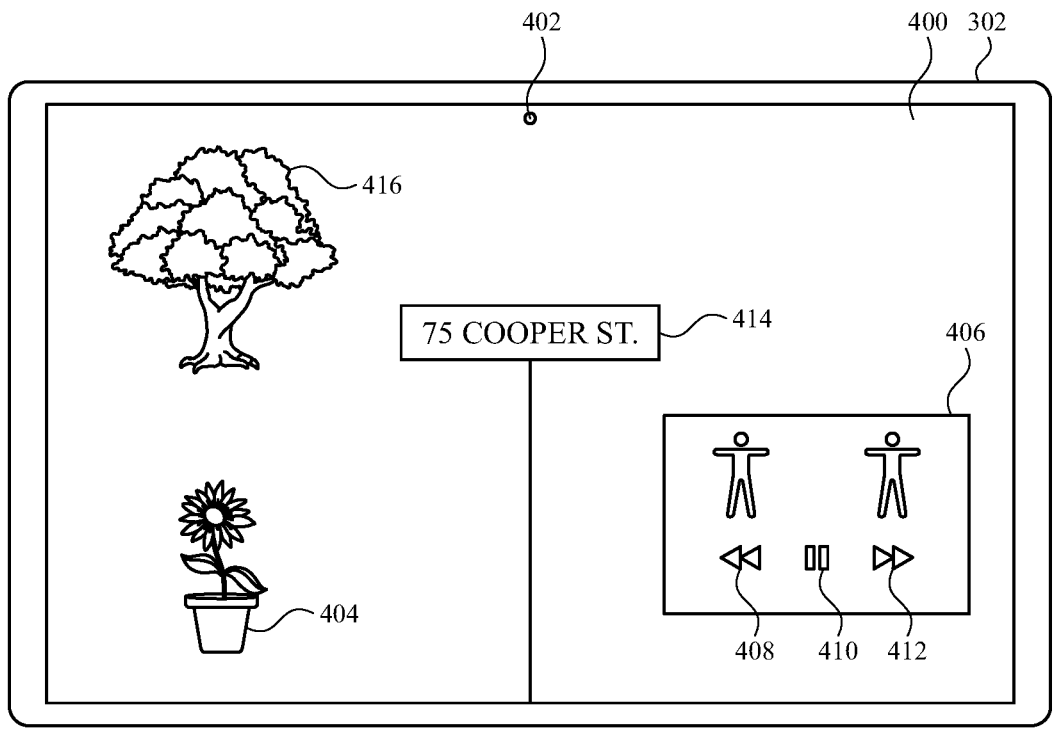
FIGS. 4A-4F illustrate a user's current view of an environment using a device.

The current view includes virtual object(s) and/or physical object(s). For example, FIG. 4A shows virtual object 402, physical object (e.g., plant) 404, virtual object 406

(e.g., a user interface of a media player application), physical object 414 (e.g., an address on a sign), and virtual object 416 (e.g., a virtual tree). Virtual object 402 functions analogously to first object 304 discussed above. For example, a user gaze input at virtual object 402 can cause virtual object 402 to expand into a list of objects, e.g., list 306. Virtual object 406 includes virtual objects (e.g., icons) 408, 410, and 412. Icons 408, 410, and 412 are respectively selectable to rewind, pause, and fast forward the currently playing media.

In some examples, device 302 performs object recognition to identify an object in the current view as particular type of object. For example, device 302 performs object recognition (e.g., on data from image sensor(s) 108) to identify physical object 404 as a particular species of plant. In some examples, the particular type of object includes text or a particular type of text e.g., phone number, email address, date, time, location, and the like. For example, device 302 recognizes object 414 to identify the text "75 Cooper St." as an address.

Objects 404, 406, 408, 410, 412, 414, and 416 each have a first (e.g., unmodified) display state. For example, device 302 displays objects 404, 406, 408, 410, 412, 414, and 416 in a default manner. As discussed below, in some examples, device 302 modifies the first display state of an object to a second (e.g., modified) display state. The second display state indicates that the DA can interact with (e.g., initiate a task based on) the object.

Figure 4B:
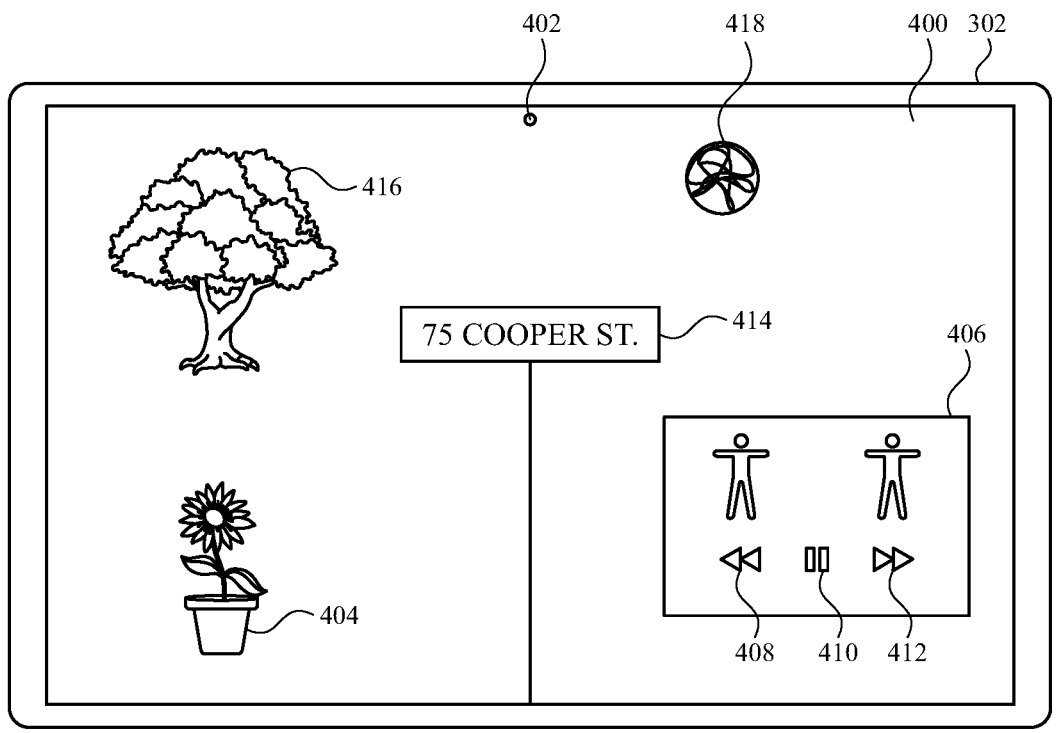

While displaying an object having the first display state, device 302 initiates a DA session responsive to receiving user input, e.g., according to the techniques discussed above with respect to FIGS. 3A-3L. For example, the user input includes a spoken trigger (e.g., "Assistant" or "Hey Assistant") for initiating a DA session. As another example, the user input corresponds to a selection (e.g., via a hand gesture) of object 418 representing the DA, as shown in FIG. 4B. Object 418 has the same functionality as second object 312 discussed above.

In some examples, device 302 initially displays object 418 in a list of objects (e.g., list 306). Object 418, when initially displayed in the list of objects, has a third display state. The third display state of object 418 indicates that a DA session has not been initiated. For example, the third display state describes the display manner of object 418 prior to displaying the initiation animation of object 418, as discussed above. In some examples, the DA session is initiated when the display state of object 418 modifies to a fourth display state. For example, the fourth display state describes the display manner of object 418 while (and/or after) displaying the initiation animation. For example, compared to being displayed in the third display state, object 418 displayed in the fourth display state is larger, is displayed in a different location (e.g., outside of list 306), and/or expands and shrinks in size responsive to audio input.

In FIG. 4B, device 302 has initiated a DA session. For example, device 302 displays object 418 outside of a list of objects, e.g., list 306.

Figure 4C:
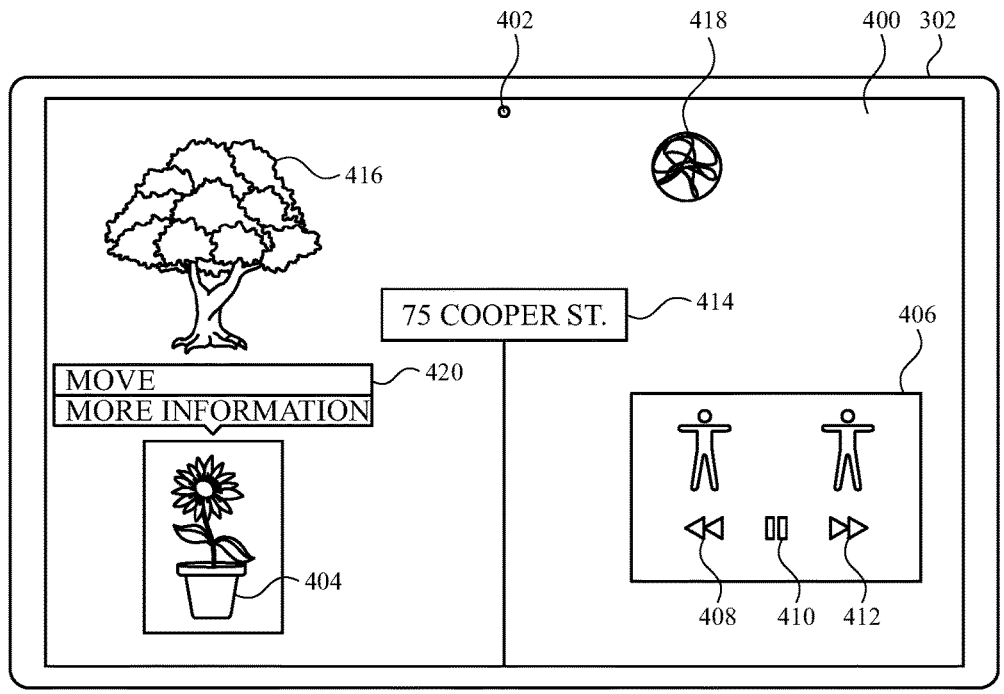

Turning to FIG. 4C, while the DA session is initiated, device 302 detects (e.g., captures) user gaze input. While the DA session is initiated, device 302 further determines, based on the captured user gaze input, that a user gaze is directed at an object (e.g., detects user gaze at object 404). In some examples, detecting user gaze at an object includes determining that the user gaze is directed at the object for a predetermined duration (e.g., 0.1 seconds, 0.25 seconds, 0.5 seconds, 1 second).

While the DA session is initiated, in accordance with a determination that the user gaze is directed at object 404, device 302 modifies the first display state of object 404 to a second display state. In some examples, the modification changes a color, size, brightness, transparency, location, or line width of object 404. In some examples, when displayed in the second display state, device 302 displays an animation of object 404, displays a border around object 404, highlights object 404 (e.g., via a display of an overlay over object 404), displays object 404 to appear closer or further from the user, displays object 404 with a higher or lower location (e.g., so it appears to rise or fall), blurs the display of object 404, or otherwise modifies the display of object 404 relative to its display in the first display state. For example, in FIG. 4C, device 302 displays a border around object 404.

In some examples, modifying the first display state of object 404 to the second display state includes displaying one or more suggested commands 420 to interact with object 404. The DA is capable of satisfying suggested command(s) 420. In FIG. 4C, suggested command(s) 420 include a command to move object 404 and a command to provide more information about object 404, e.g., provide information about the recognized plant species from a knowledge base such as Wikipedia.

In some examples, device 302 modifies the first display state of object 404 to the second display state in accordance with identifying object 404 as a particular type of object, e.g., via object recognition, as discussed above.

In some examples, in accordance with a determination that the user gaze is directed at object 404, device 302 determines whether object 404 is of a predetermined type. In some examples, device 302 modifies the first display state of object 404 in accordance with a determination that object 404 is of the predetermined type. In some examples, predetermined types of objects include objects the DA can interact with, e.g., objects based on which the DA can initiate a task. In FIG. 4C, for example, object 404 is of the predetermined type, as the DA can initiate tasks related to the plant. But object 416 is not of the predetermined type, as the DA cannot initiate tasks related to the virtual tree, e.g., move the virtual tree, remove the virtual tree, or provide more information about the virtual tree.

In some examples, in accordance with a determination that the user gaze is directed at an object and a determination that the object is not of the predetermined type, device 302 forgoes modifying the first display state of the object. For example, if the user gazes at object 416 while the DA session is initiated, device 302 does not display a border around object 416. In this manner, device 302 indicates which objects the DA can and cannot interact with, thereby providing the user with feedback so they avoid issuing requests the DA cannot satisfy.

In some examples, after modifying the first display state of an object to the second display state, device 302 displays the object in a second display state for a predetermined duration, e.g., 1 second, 2 seconds, 5 seconds, 10 seconds. After the predetermined duration, device 302 displays the object in the first display state. In some examples, device 302 displays the object in the second display state until device 302 ceases to detect user gaze at the object. For example, device 302 displays the object in the first display state upon ceasing to detect user gaze at the object, or a predetermined duration (e.g., 1 second, 5 seconds) after ceasing to detect user gaze at the object. In some examples, ceasing to detect user gaze at an object includes not detecting user gaze at the object within a predetermined duration (e.g., 1 second, 2 seconds, 5 seconds) before a current time.

Figure 4D:
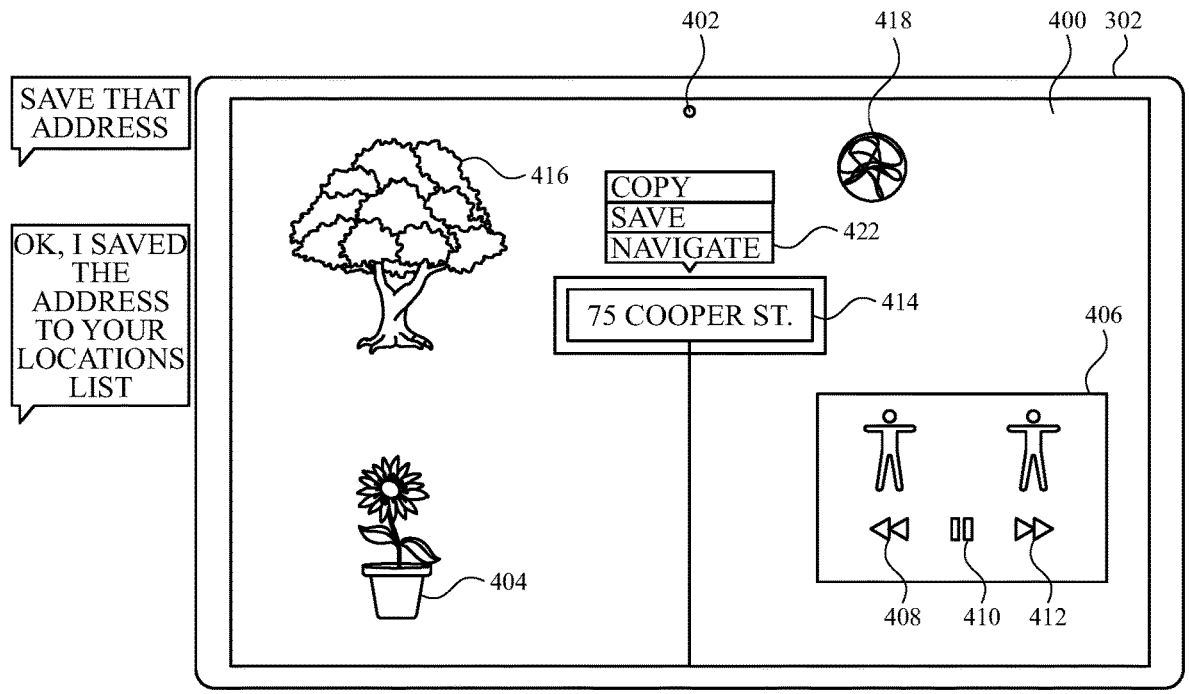

Turning to FIG. 4D, while the DA session is initiated, device 302 determines that user gaze is directed at object 414 (e.g., detects user gaze at object 414). Device 302 thus modifies the first display state of object 414 to the second display state, as indicated by the displayed border around object 414. Device 302 further displays suggested commands 422, e.g., to copy the street address, to save the street address, and to navigate to the street address.

In some examples, while the DA session is initiated, and after modifying the first display state of object 414 to the second display state, device 302 receives a speech input, e.g., "save that address" in FIG. 4D. Device 302 determines, based on captured user gaze input, whether the speech input corresponds to interaction with object 414.

In some examples, determining whether the speech input corresponds to interaction with object 414 includes determining a timing of the user gaze at object 414 relative to a timing of the speech input. For example, device 302 determines that the speech input corresponds to interaction with object 414 if user gaze at object 414 is detected within a predetermined time window around the start time of the speech input (e.g., within 0.5 seconds before and 0.5 seconds after the start time), if user gaze at object 414 is detected while receiving the speech input (or a portion thereof), and/or if user gaze at object 414 is detected within a second predetermined time window around the end time of the speech input (e.g., within 0.5 seconds before and 0.5 seconds after the end time). In some examples, determining that the speech input corresponds to interaction with object 414 includes determining that the speech input (or a portion thereof) is received while object 414 is displayed in the second display state.

In some examples, device 302 determines whether the speech input corresponds to interaction with object 414 without receiving a spoken trigger and without receiving other inputs selecting object 418 (e.g., gesture input). In some examples, device 302 determines whether the speech input corresponds to interaction with object 414 without receiving a gesture input corresponding to a selection of object 414, e.g., pointing gestures at object 414, gestures pinching object 414, and the like. In this manner, device 302 is not required to rely on explicit signals (e.g., spoken trigger input, gestures selecting object 418, button presses) to determine that the speech input corresponds to interaction with object 414 (e.g., to determine that the speech input is intended for the DA). This in turn reduces the number of user inputs required to interact with device 302 and the cognitive burden on the user, thereby providing a more efficient user-device interaction.

In some examples, the speech input includes a deictic reference (e.g., "it," "this," "that," "they," "him," "her," "the thing," and the like) to object 414. In some examples, determining that the speech input corresponds to interaction with object 414 includes determining, based on the captured gaze input, that the deictic reference refers to object 414. For example, device 302 detects user gaze at object 414 while providing at least a portion of the speech input "save that address." The DA thus determines that "that address" refers to object 414. In some examples, device 302 determines that the deictic reference refers to object 414 based on determining that object 414 is displayed in the second display state when device 302 receives at least of portion of the speech input. For example, because device 302 displays a border around object 414 when receiving the speech input "save that address," the DA determines that "that address" likely refers to object 414. In some examples, determining that the deictic reference refers to object 414 is based on the relative timing of user gaze at object 414 and of the speech input, e.g., analogously to how device 302 determines that the speech input corresponds to interaction with object 414. In this manner, DA 302 can correctly interpret ambiguous requests to interact with objects of interest, thereby allowing the user to efficiently operate the device. For example, instead of explicitly specifying object 414 (e.g., by speaking "save 75 Cooper St. in my list of addresses") the user can provide a deictic reference to object 414 (e.g., "save that address").

In FIG. 4D, in accordance with a determination that the speech input corresponds to interaction with object 414, the DA initiates a task based on the speech input and object 414. The DA further causes device 302 to provide an output (e.g., audio output and/or displayed output) indicative of the initiated task. For example, the DA saves the "75 Cooper St." address to the user's location list and device 302 provides the output "Ok, I saved the address to your locations list." As another example, if in FIG. 4C, device 302 determines that the speech input "tell me more about that" corresponds to interaction with object 404, the DA initiates a task to provide more information about the recognized plant species. Device 302 thus provides an output such as "*Bellis perennis*, the daisy, is a common European species of the family Asteraceae . . . ."

In some examples, in accordance with a determination that the speech input does not correspond to interaction with an object, the DA forgoes initiating the task. For example, if in FIG. 4D, the user speaks to a friend (e.g., asking what to have for dinner), device 302 can determine that the speech input does not correspond to interaction with any object. The DA thus forgoes initiating the erroneous task of providing suggestions for nearby restaurants.

Figure 4E:
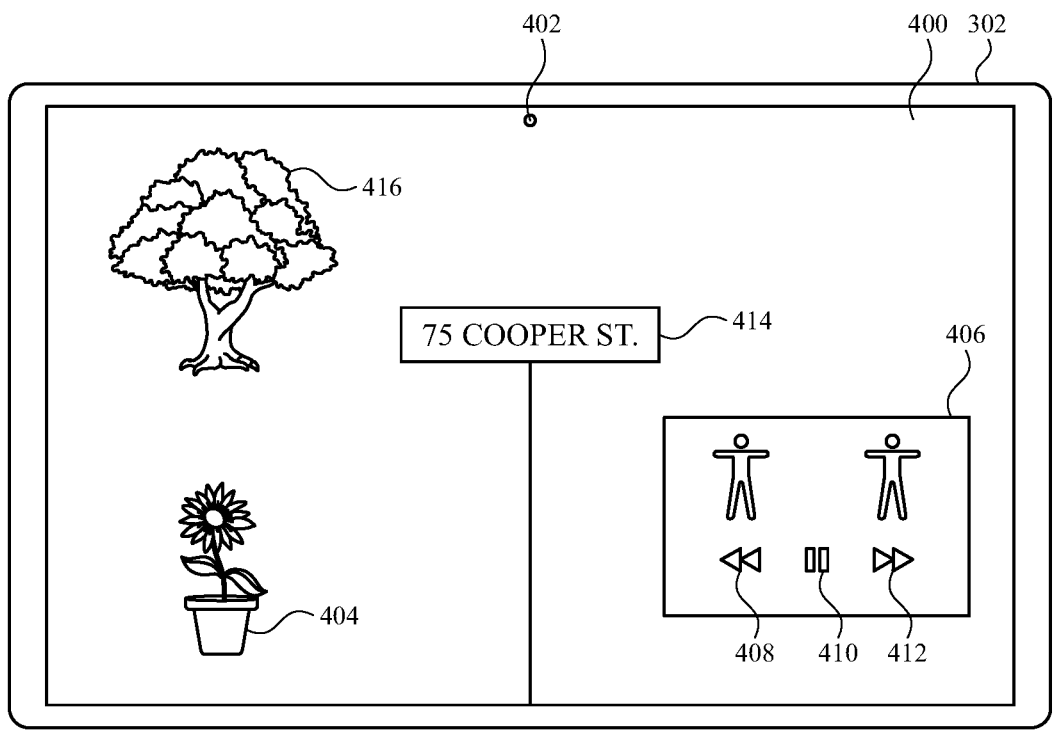

Turning to FIG. 4E, the DA session is no longer initiated, e.g., is dismissed. For example, object 418 representing the DA is no longer displayed, e.g., in accordance with device 302 determining that one or more DA dismissal criteria as satisfied, as discussed above. In some examples, while the DA session is not initiated, in accordance with a determination, based on the captured user gaze input, that the user gaze is directed at an object, device 302 forgoes modifying the first display state of the object. For example, if the user gazes at object 404 in FIG. 4E, device 302 does not display a border around object 404, e.g., like in FIG. 4C.

Figure 4F:
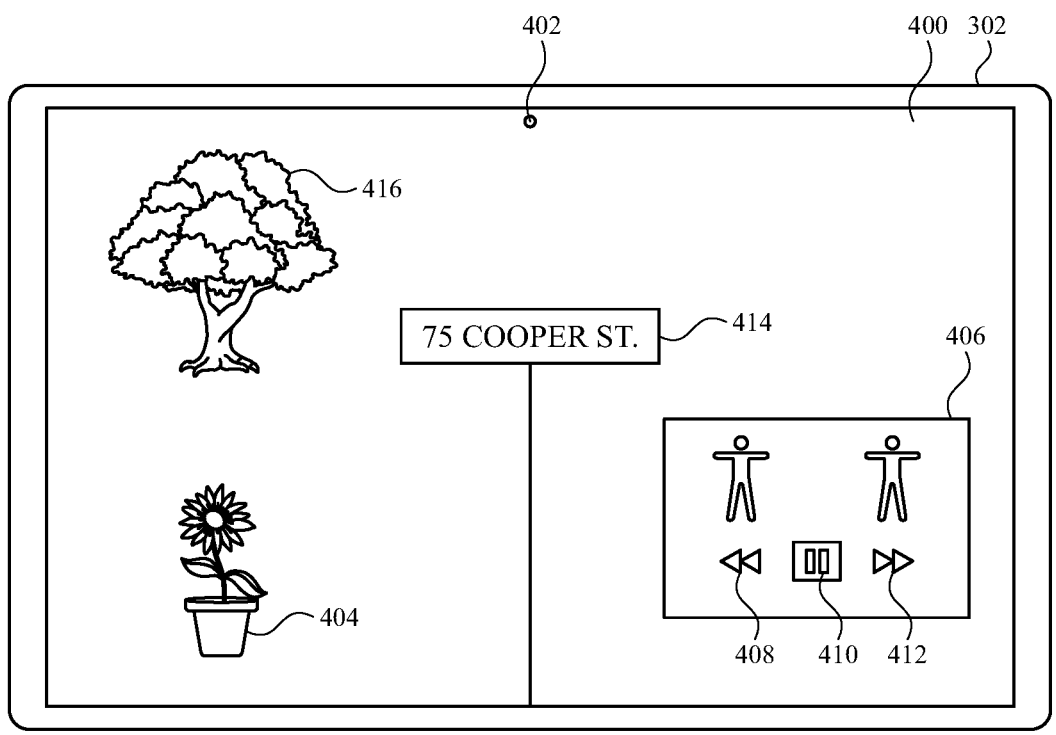

Turning to FIG. 4F, in some examples, while the DA session is not initiated, device 302 detects an appendage (e.g., arm, hand, finger, or the like) of the user, e.g., using image sensor(s) 108. Device 302 further determines whether the appendage corresponds to a predetermined pose, e.g., arm pose, hand pose (e.g., hand raised), finger pose (e.g., predetermined position(s) of finger(s)). In some examples, while the appendage is determined to correspond to the predetermined pose and in accordance with a determination that user gaze is directed at an object, device 302 modifies the first display state of the object to the second display state. For example, in FIG. 4F, while the DA session is not initiated, device 302 detects that the user's hand is raised and that the user gazes at object 410. Device 302 thus displays object 410 in the second display state. The user can then select object 410 (e.g., via a pinch gesture) to perform the corresponding command of pausing the playing media. In this manner, while the user's hand is raised or while the DA session is initiated, as the user gazes around, device 302 indicates objects that the DA can interact with.

In some examples, the DA can cause device 302 to display different XR environments responsive to corresponding user requests. For example, if environment 400 were a virtual environment (e.g., objects 404-416 are each virtual objects displayed in a virtual background), the user can provide a user request to cause device 302 to display the view of FIG. 4E. In some examples, device 302 receives user input to save an XR environment, e.g., with a user selected name such as "XR environment #1." The DA can then cause device 302 to display the saved environment responsive to commands such as "show me XR environment #1." In some examples, user input to save an XR environment saves a configuration of virtual object(s) superimposed over an environment, e.g., the location(s) of the object(s). For example, device 302 can receive user inputs to position viewpoint locked virtual object(s) at preferred locations and receive user input to save the configuration, e.g., with a user selected name such as "configuration #1". Accordingly, responsive to user requests such as "load configuration #1," the DA can cause device 302 to display the viewpoint locked virtual object(s) at the preselected location(s).

In some examples, while providing (e.g., displaying) an XR environment, device 302 operates in a guest mode. For example, it may be desirable to operate device 302 in a guest mode when a non-principal user uses device 302. In some examples, a principal user of device 302 includes an authorized user of device 302, e.g., a user whose authentication credentials (e.g., password, biometric authentication credentials) device 302 is configured to recognize. In some examples, device 302 operates in the guest mode in accordance with receiving user input to enable the guest mode. In some examples, device 302 operates in the guest mode when operating in a non-authenticated (e.g., locked) state.

In some examples, when operating in the guest mode, device 302 limits some DA functionalities. For example device 302 prevents the DA from handling predetermined types of requests. Example predetermined types of requests include requests to launch an application (or to launch certain applications (e.g., a payment application, a home appliance control application)) and personal requests. A personal request generally describes a user request having a response dependent on the particular user who provided the request. For example, a personal request corresponds to a personal domain, e.g., a domain associated with an actionable intent requiring the retrieval/modification of personal data. Example personal data includes a user's contacts data, email data, message data, calendar data, reminders data, photos, videos, health information, financial information, web search history, media data (e.g., songs and audiobooks), information related to a user's home (e.g., the states of the user's home appliances and home security systems, home security system access information), DA settings (e.g., language settings), preferences (e.g., food preferences, music preferences), and any other sensitive and/or private information the user may not want to expose to other users or devices. Example personal requests include "call mom" (as users can have different mothers), "how many calories did I burn today?", "how much did I spend this month?", "show me the last picture I took," "turn off the porch light," "lock the front door," "read my messages," and the like. In contrast, non-personal requests may have responses independent of the user who provided the non-personal request. Example non-personal requests include "how old is Taylor Swift?", "what's the weather in Palo Alto?", and "what's the score of the Patriots game?".

In some examples, while operating in the guest mode, and in accordance with a determination that a received request is of the predetermined type, the DA outputs an error, e.g., "sorry I can't do that."

Figure 5A:
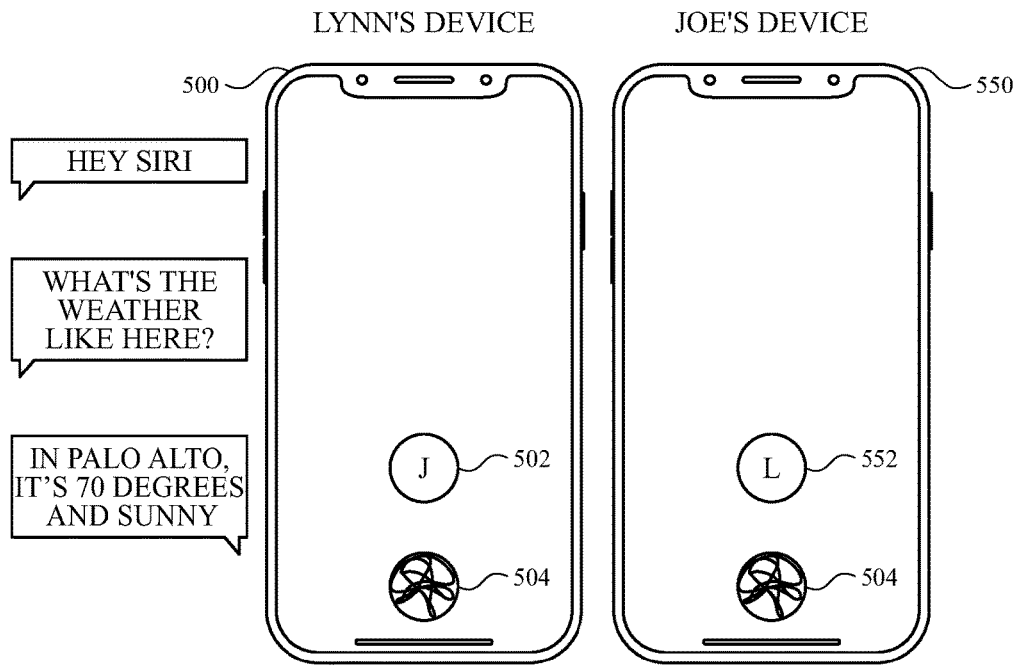
FIGS. 5A-5B illustrate digital assistant interactions in a communication session, according to various examples.
Figure 5B:
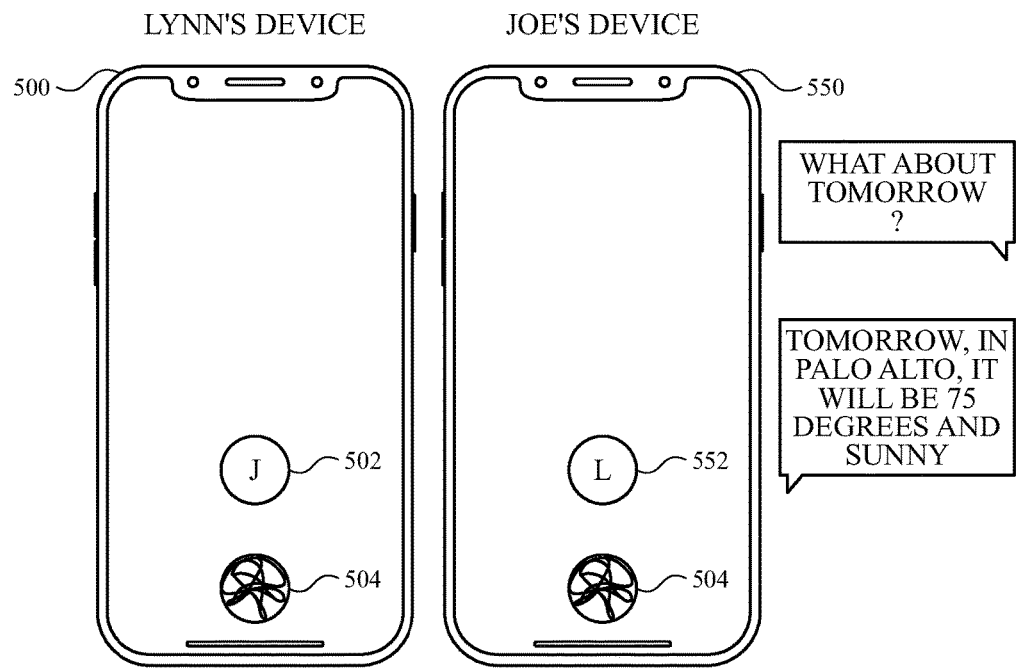

FIGS. 5A-5B illustrate digital assistant interactions in a communication session, according to various examples. Further details about digital assistant interactions in communication sessions are described in U.S. Patent Application No. 63/233,001, entitled "DIGITAL ASSISTANT INTERACTION IN A COMMUNICATION SESSION," filed on Aug. 13, 2021 and in U.S. patent application Ser. No. 17/158,703, entitled "DIGITAL ASSISTANT INTERACTION IN A VIDEO COMMUNICATION SESSION ENVIRONMENT," filed on Jan. 26, 2021. The contents of each of these applications are hereby incorporated by reference in their entireties.

In FIGS. 5A-5B, device 500 is engaged in a communication session with external device 550. Device 500 and device 550 are each implemented as separate instances of device 302. As shown, device 500 belongs to a user named Lynn and device 550 belongs to a user named Joe. While the below describes device 500 engaged in a communication session with a single external device 550, it will be appreciated that the below techniques may be applied to communication sessions including more than two devices.

A communication session is provided by multiple electronic devices and allows the participants in the session to share communications, e.g., textual, audio, and/or video communications. For example, the communication session corresponds to an audio communication session (e.g., a phone call), a video communication session (e.g., a video conference), a textual communication session (e.g., a group text message session), and/or a virtual or mixed reality communication session. For example, in a virtual or mixed reality communication session, the respective devices of the participants each provide an audiovisual experience to simulate each participant (or their respective avatar) being concurrently present in a shared location. For example, a virtual or mixed reality communication session can simulate each participant being present in a physical or virtual room of a house. In some examples, a communication session includes different types of communication experiences (e.g., audio, video, textual, virtual or mixed reality) provided by the respective devices of the participants. For example, in a communication session, a first device may provide a virtual or mixed reality communication experience (e.g., by displaying virtual representation(s) of other participant(s) in a virtual setting) while a second device may provide a video communication experience (e.g., by displaying video of the other participant(s)). Accordingly, a communication session may be provided by multiple devices having different capabilities, e.g., by a device having virtual reality capability and a device having limited or no virtual reality capability, by a device having video capability and a device having no video capability.

In FIGS. 5A-5B, device 500 displays representation 502 indicating that the user of external device 550 (e.g., Joe) participates in the communication session. Similarly, external device 550 displays representation 552 indicating that the user of device 500 (e.g., Lynn) participates in the communication session. While FIGS. 5A-5B show that representations 502 and 552 each indicate the name of a respective user, in other examples, representations 502 and 552 each include live video of the respective user and/or each include a respective physical representation (e.g., an avatar) of the respective user.

In FIG. 5A, device 500 receives, from Lynn, input to initiate a DA session (e.g., input to initiate a session of a first DA operating on device 500). In some examples, some types of inputs initiate a DA session while other types of inputs, as discussed below, indicate whether a natural language input is intended for a DA without initiating the DA session. In some examples, input to initiate a DA session includes spoken trigger input e.g., "Hey Siri," "Siri," "Assistant,"

"Wake up," and the like. In some examples, input to initiate a DA session includes a selection of a button of the corresponding device (e.g., device 500), such as a selection of a physical button of the device or selection (e.g., via a gesture) of an object (e.g., objects 312 or 418) displayed by the device. In some examples, input to initiate a DA session includes detected gaze input, as discussed above. In some examples, a device interprets gaze input as input to initiate a DA session when the communication session does not include any currently initiated DA session. When the communication session includes a currently initiated DA session (e.g., a DA session has been initiated on a device in the communication session without being dismissed), the device interprets gaze input to indicate that a natural language input is intended for a DA, but does not interpret the gaze input as input to initiate the DA session.

In FIG. 5A, Lynn provides the spoken trigger input "Hey Siri" to device 500. In response, device 500 initiates a DA session, e.g., by displaying DA indicator 504. Device 500 further causes external device 550 to display DA indicator 504 to indicate that the communication session includes an initiated DA session.

Lynn further provides a natural language input including a user request, e.g., "what's the weather like here?" to the first DA. In some examples, the first DA (operating on device 500) generates and outputs a response to the user request using Lynn's context information (e.g., personal context information). In some examples, personal context information includes personal data (discussed above), data from sensor(s) of device 500 (e.g., location data, temperature data, orientation data, camera data), applications installed on device 500, a battery level of device 500, a network connectivity status of device 500, and any other information specific to device 500 or to Lynn. For example, using the context information, the first DA disambiguates "here" to mean Lynn's current location (e.g., Palo Alto, California) and generates and outputs the response "In Palo Alto, it's 70 degrees and sunny." In some examples, a device transmits audio inputs received by the device and audio outputs generated by the respective DA to the other external device(s) in the communication session. For example, device 500 transmits the response "In Palo Alto, it's 70 degrees and sunny" to external device 550 and external device 550 outputs the response.

Turning to FIG. 5B, in some examples, the user of device 550 (e.g., Joe) provides a follow up request (e.g., a natural language input) to device 550. For example, Joe provides the audio input "what about tomorrow?". In some examples, device 550 receives a follow up request without receiving input to initiate a DA session, e.g., without receiving the input after the most recent DA response is output. In some examples, the first DA generates and outputs a response to a follow up request without device 550 receiving input to initiate a DA session, e.g., without receiving the input after the most recent DA response is output. For example, after device 550 outputs "In Palo Alto, it's 70 degrees and sunny," Joe speaks "what about tomorrow?" without providing spoken trigger input. In some examples, a follow up request excludes a response to a DA generated prompt for user input, e.g., a prompt to clarify or request additional information about a previously requested task.

In some examples, device 550 determines whether the follow up request is intended for the first DA operating on device 500. In some examples, device 550 determines that the follow up request is intended for the first DA based on gaze input, e.g., based on detecting user gaze at DA indicator 504. In this manner, device 550 can distinguish between natural language inputs intended as conversation between the participants in the communication session and natural language inputs intended as requests to a DA.

In some examples, in accordance with a determination that the follow up request is intended for the first DA, the first DA generates and outputs a response to the follow up request. In some examples, the first DA generates the response based on context information of the user of the respective device, e.g., Lynn's context information. In some examples, the first DA generates the response based on conversational context information. For example, the conversational context information indicates a domain associated with previous user-DA dialog (e.g., a weather domain). In FIG. 5B, for instance, based on Lynn's context information (e.g., location) and the weather domain, the first DA disambiguates the user request "what about tomorrow?" to mean requesting tomorrow's weather information for Palo Alto, California. The first DA thus generates and outputs the response, "Tomorrow, in Palo Alto, it will be 75 degrees and sunny."

In some examples, the context information includes a DA language setting, e.g., indicating the language in which the DA is configured to operate. For example, because the first DA's language setting is English, the first DA generates the English response "Tomorrow, in Palo Alto, it will be 75 degrees and sunny."

In some examples, each device in a communication session outputs any DA generated responses according to the language setting of the device's respective DA. For example, in FIG. 5B, suppose the first DA is configured to operate in English and a second DA (e.g., operating on device 550) is configured to operate in Spanish. Accordingly, device 500 outputs the response "Tomorrow, in Palo Alto, it will be 75 degrees and sunny" in English. Device 500 further transmits the response to device 550. In accordance with receiving the response, device 550 determines that the response is not in the language in which the second DA configured to operate. Device 550 thus translates the response into the second DA's language (e.g., Spanish) and outputs the translation. Similarly, in FIG. 5A, device 550 can translate the response "In Palo Alto, it's 70 degrees and sunny" to Spanish and output the Spanish translation.

Accordingly, FIGS. 5A-5B show that the first DA responds to follow up requests using the context information of the user who most recently initiated the DA session, e.g., the current initiator Lynn. For example, suppose the user of device 550 (Joe) most recently initiated a DA session (so Joe is now the current initiator) and the second DA generates a response to Joe. Thereafter, the second DA generates a response to any follow up request (e.g., from Lynn) based on Joe's context information.

In some examples, the first DA responds to follow up requests using the context information of the user who provided the follow up request (the follow up user). For example, the first DA can generate the response to "what about tomorrow?" based on Joe's context information and/or the conversational context. For example, based on Joe's current location (e.g., New York) and the conversational context indicating the weather domain, the first DA disambiguates "what about tomorrow?" to mean requesting tomorrow's weather information for New York City. The first DA thus generates the response "In New York City tomorrow, it will be 32 degrees and snowing."

In some examples, to respond to a follow up request using the context information of the follow up user, first DA must access the context information from external device 550. Generally, for privacy reasons, the context information of a user remains on the user's device. Accordingly, in some examples, Joe provides context authorization input to authorize device 550 to transmit Joe's context information to device 500 on which the first DA operates. In some examples, device 550 transmits Joe's context information (or a subset thereof) in accordance with receiving the context authorization input, receiving follow up request, and determining that the follow up request is intended for the first DA.

In some examples, the context authorization input authorizes device 550 to transmit only a subset of Joe's context information. For example, the subset includes predetermined type(s) of context information relevant to a current domain of the dialog between the participants and the DA. For example, the first DA determines a current domain of the dialog (e.g., a weather domain) and requests device 550 to transmit predetermined type(s) of context information relevant to current domain, e.g., device 550's location information. In accordance with receiving the request, device 550 transmits the predetermined type(s) of context to device 500. Alternatively, device 550 (e.g., the second DA) determines the current domain of the dialog and transmits the predetermined type(s) of context information without receiving a request from device 500.

The predetermined type(s) of context information transmitted by device 550 can thus vary based on the current domain of the dialog. For example, if the current domain is a "schedule a meeting" domain, device 550 transmits context information including information about Joe's calendar entries. As another example, if the current domain is a "play media" domain, device 550 transmits context information including Joe's media preferences, e.g., favorite movies, favorite music genre, and the like. In some examples, the context authorization input can selectively authorize (or prohibit) device 550 from transmitting certain types of context information, e.g., health information, financial information, or location information.

In some examples, a setting of the communication session specifies whether first DA responds to follow up requests using the context information of the current initiator or the context information of the follow up user. In some examples, the first user who joins the communication session, or a host of the communication session, can change the setting. Thus, by consistently using a known user's context information to respond to follow up requests, a DA may avoid confusion about whose context information is used to generate responses, thus increasing the efficiency of the user DA-interaction, e.g., by preventing the DA from generating erroneous responses.

In some examples, a participant in a communication session may desire to privately interact with the first DA, e.g., so that other participants in the communication session do not perceive the user's request to the first DA and/or do not perceive the first DA's response. Accordingly, in some examples, device 500 determines whether one or more privacy criteria are satisfied. In accordance with determining that the one or more privacy criteria are satisfied, device 500 forgoes transmitting (or ceases transmitting) natural language input received at device 500 and first DA's generated response to the natural language input, e.g., to external device(s) in the communication session. In some examples, the one or more privacy criteria are satisfied when a mute setting of the communication session is active. For example, during the communication session, the user may select a displayed mute icon to have a private DA interaction. In some examples, the one or more privacy criteria are satisfied in accordance with detecting a predetermined type of user pose (e.g., hand pose) while receiving the natural language input (or a portion thereof). For example, a user can have a private DA interaction by providing a natural language input to the DA while their hand covers their mouth. In some examples, the one or more privacy criteria are no longer satisfied after device 500 outputs the DA response. For example, after device 500 outputs the DA response, device 500 transmits natural language inputs received at device 500 and the first DA's generated responses to other external device(s) in the communication session.

While the above description of FIGS. 5A-5B describes operations performed by a single device (or the device's respective DA), it will be appreciated that another device (or the other device's respective DA) can analogously perform the operations. For example, operations performed by device 500 (and/or the first DA) may be performed by device 550 (and/or the second DA).

FIGS. 6A-6E illustrate techniques for dictation using device 600, according to some examples. Device 600 is implemented as device 302 and includes dictation functionality (e.g., provided by ASR module 202).

FIG. 6A illustrates user interface 602 of a dictation enabled application of device 600, e.g., a note taking application. A dictation enabled application includes a input field where the user can input text by speaking. Other example dictation enabled applications include a web browsing application, a word processing application, a messaging application, and the like.

FIG. 6B shows that device 600 receives audio input for dictation, e.g., "I would like to." In some examples, device 600 initiates a dictation mode responsive to receiving user input, e.g., input selecting the microphone icon in keyboard 604. In some examples, initiating the dictation mode includes activating a microphone of device 600 and converting sampled audio input into displayed text. For example, device 600 performs automatic speech recognition to display "I would like to" in user interface 602.

FIG. 6C shows that while the dictation mode is initiated, device 600 receives input 606. Input 606 does not include audio input and corresponds to input to enter character(s) (e.g., word(s), phrase(s), symbol(s), letter(s), etc.) in the input field. For example, in FIG. 6C, input 606 includes touch input to type the words "go on a."

In some examples, in accordance with receiving input 606, the dictation mode remains active. For example, device 600 does not deactivate the dictation mode (e.g., deactivate the microphone to cease sampling audio input) responsive to receiving input 606. In this manner, during dictation, if a user pauses speaking to manually enter character(s), device 600 remains in the dictation mode Accordingly, the user is not required to re-provide input (e.g., another selection of the microphone icon) to resume the dictation after manually entering the character(s). For example, in FIG. 6D, after typing "go on a," the user resumes dictating by providing the audio output "vacation." Device 600 thus displays "vacation" in the input field.

In some examples, device 600 detects a user gaze at displayed character(s). In some examples, in accordance with detecting the user gaze, device 600 modifies the display manner of the character(s), e.g., changes the color of the character(s), highlights the character(s), changes the font of the character(s), changes the font size of the character(s), and the like. For example, in FIG. 6D, device 600 detects a user gaze at "vacation" and thus highlights "vacation."

Figure 6E:
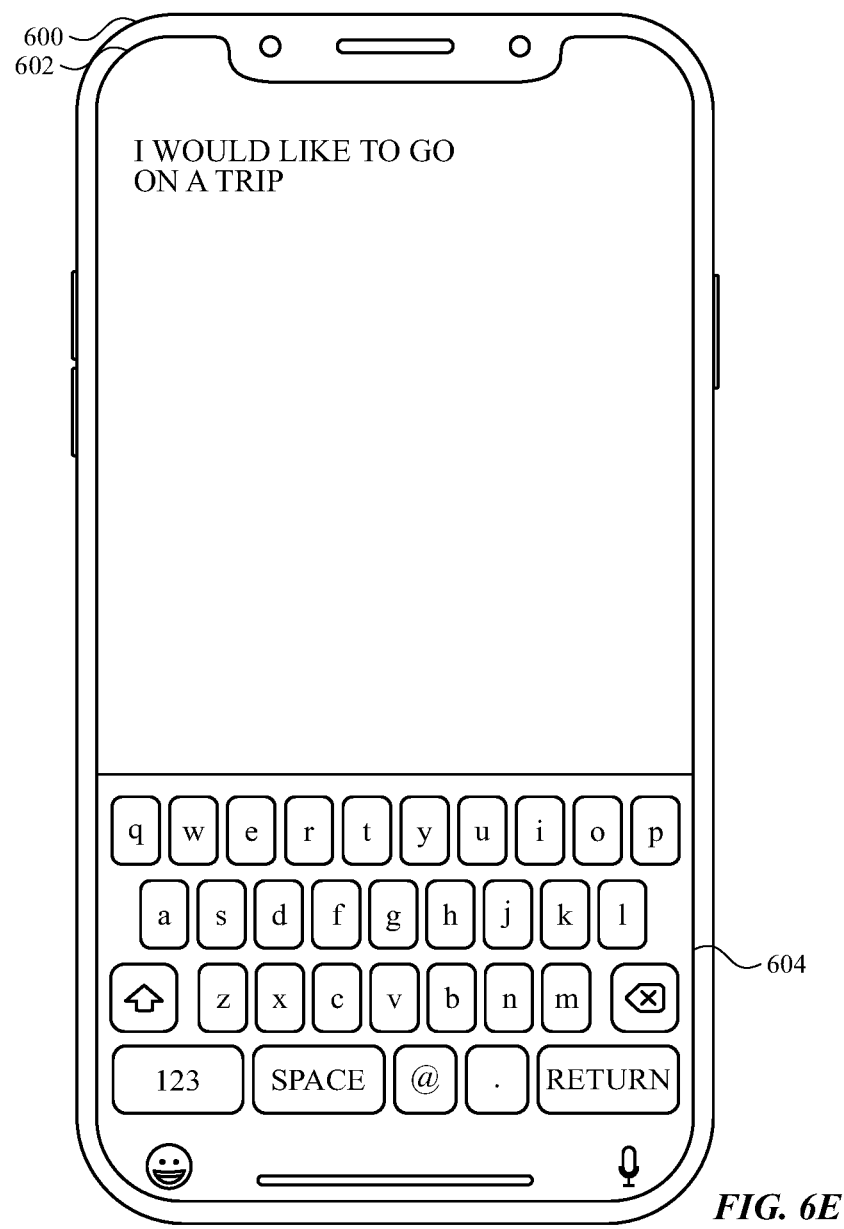

In some examples, while the display manner of the character(s) is modified, device 600 receives a natural language input to alter the character(s). The natural laninput corresponds to changing the character(s), adding additional character(s), removing the character(s), or undoing the character(s) (e.g., removing the most recently input character(s) of the character(s)). In some examples, a DA interprets such input and performs a corresponding task. For example, in FIG. 6D, device 600 receives the input "change that to trip" and processes the input to cause device 302 to change "vacation" to "trip," as shown in FIG. 6E. Further details about using gaze input and speech input to control dictation are described in U.S. Patent Application No. 63/240,696, entitled "GAZE BASED DICTATION," filed on Sep. 3, 2021, the content of which is hereby incorporated by reference in its entirety.

Figure 7:
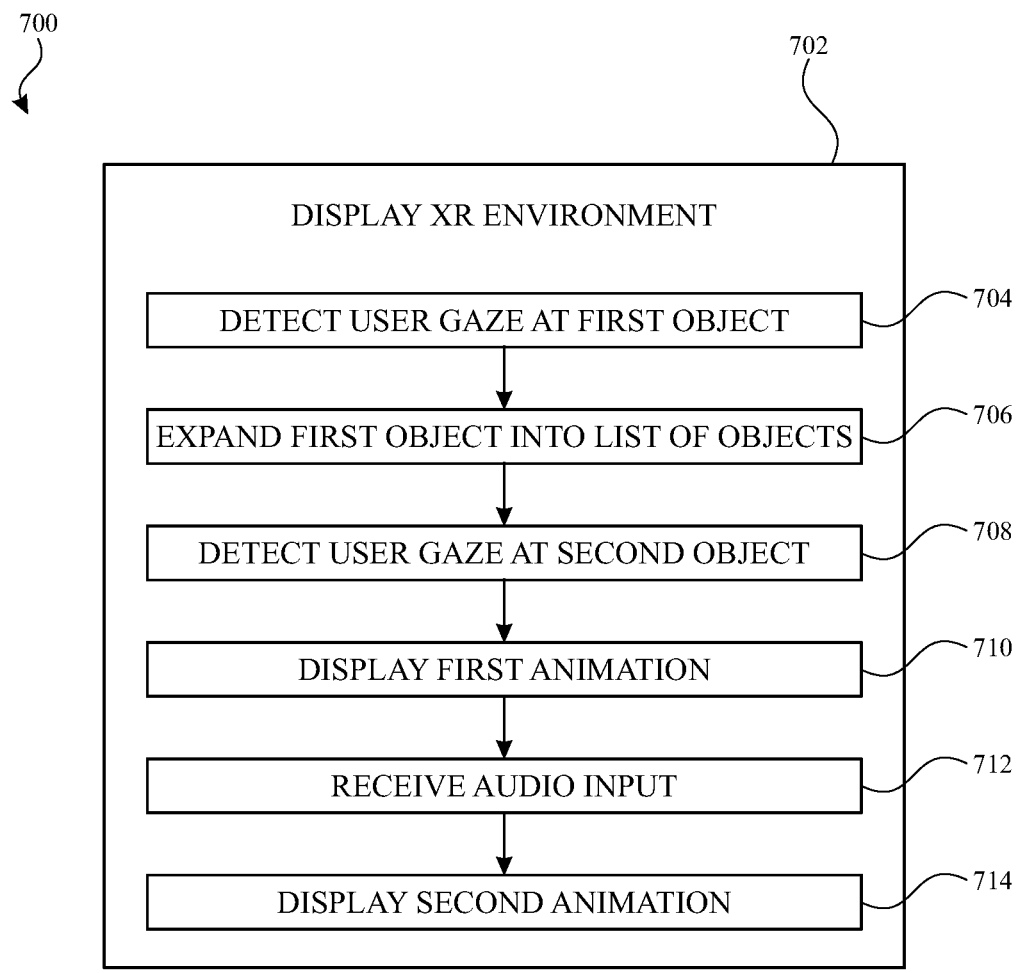
FIG. 7 illustrates a process for interacting with a digital assistant, according to various examples.

FIG. 7 illustrates process 700 for interacting with a digital assistant, according to various examples. Process 700 is performed, for example, at a device (e.g., device 302, device 500, device 550, device 600). In process 700, some operations are, optionally, combined, the orders of some operations are, optionally, changed, and some operations are, optionally, omitted. In some examples, additional operations are performed in combination with process 700.

At block 702, a portion of an extended reality (XR) environment (e.g., environment 300) representing a current field of view of a user of the electronic device (e.g., device 302) is displayed (e.g., by device 302).

At block 704, a user gaze at a first object (e.g., first object 304) displayed in the XR environment is detected with one or more sensors (e.g., image sensor(s) 108) of the electronic device. In some examples, the first object is persistent in the current field of view of the XR environment.

At block 706, in response to detecting the user gaze at the first object, the first object is expanded into a list of objects (e.g., list 306), where the list of objects includes a second object (e.g., second object 312) representing a digital assistant (e.g., DA 200). In some examples, expanding the first object into the list of objects includes displaying a third animation of the second object.

At block 708, a user gaze at the second object is detected with the one or more sensors.

At block 710, in accordance with detecting the user gaze at the second object, a first animation (initiation animation) of the second object is displayed. The first animation indicates that a digital assistant session is initiated. In some examples, the first animation of the second object includes displaying a change in a shape, a size, or a color of the second object. In some examples, the first animation of the second object includes moving the second object away from the list of objects. In some examples, displaying the first animation of the second object includes ceasing to display the list of objects.

At block 712, a first audio input is received from the user of the electronic device. In some examples, displaying the first animation of the second object includes determining, based on the user's gaze at the second object, that the first audio input is intended for the digital assistant.

At block 714, a second animation of the second object is displayed. The second animation (listening animation) indicates that the digital assistant is actively listening to the user in response to receiving the first audio input. The first animation is different from the second animation of the second object. In some examples, the second animation of the second object includes expanding and shrinking a size of the second object responsive to the first audio input.

In some examples, while displaying the list of objects, a hand gesture from the user is received, the hand gesture corresponding to a selection of the second object. In some examples, in response to receiving the hand gesture, the first animation of the second object is displayed.

In some examples, a second audio input including a spoken trigger for initiating a digital assistant session is received. In some examples, in response to receiving the second audio input, the digital assistant session is initiated, including displaying the first animation of the second object.

In some examples, a virtual object (e.g., virtual object 314) is displayed in response to receiving the first audio input, the virtual object corresponding to a response, by the digital assistant, to the first audio input. In some examples, the virtual object and the second object are persistent in the current field of view of the XR environment. In some examples, the second object is persistent in the current field of view of the XR environment while the virtual object is positioned at a fixed location in the XR environment. In some examples, the virtual object and the second object are positioned at respective fixed locations in the XR environment. In some examples, the virtual object is displayed below the second object. In some examples, the virtual object is positioned within a predetermined distance from the second object in the XR environment.

In some examples, a request to interact with the virtual object is received from the user. In some examples, in response to receiving the request to interact with the virtual object, the virtual object is expanded into a user interface of an application corresponding to the virtual object (e.g., user interface 316). In some examples, the request to interact with the virtual object corresponds to moving the virtual object from an initial location (e.g., the location of virtual object 314 in FIG. 3H) to a destination location (e.g., the location of virtual object 314 in FIG. 3I). In some examples, expanding the virtual object into the user interface includes displaying the user interface at the destination location. In some examples, the second object is displayed while the user interface is displayed and the user can control the application using the second object by gazing at the second object or by speaking a trigger phrase.

In some examples, a request to integrate the virtual object into a second application is received. In some examples, in response to receiving the request to integrate the virtual object into the second application, the virtual object is integrated into the second application, including displaying a content of the virtual object within a user interface of the second application (e.g., user interface 318). In some examples, while the content of the virtual object is displayed within the user interface of the second application, the second object is displayed outside of the user interface of the second application. In some examples, while the content of the virtual object is displayed within the user interface of the second application, the second object is displayed inside of the user interface of the second application.

In some examples, in accordance with displaying the second object: the second object ceases to be displayed a predetermined duration after displaying the virtual object; and the first object is displayed. In some examples, in accordance with displaying the second object: the second object ceases to be displayed a third predetermined duration after receiving the first audio input from the user; and the first object is displayed.

In some examples, it is determined whether one or more digital assistant dismissal criteria are satisfied. In some examples, in accordance with a determination that the one or more digital assistant dismissal criteria are satisfied, the second object ceases to be displayed. In some examples, satisfying the digital assistant dismissal criteria includes at least one of: determining that the user's attention is not directed to the virtual object; determining that the user's attention is not directed to the virtual object for at least a second predetermined duration; and determining that the user has used a gesture to interact with a user interface element displayed in the XR environment, where the user interface element does not correspond to the digital assistant.

The operations discussed above with respect to FIG. 7 are optionally implemented by the components depicted in FIGS. 1A-1B and 2A, e.g., by system 100 and DA 200.

Figure 8:
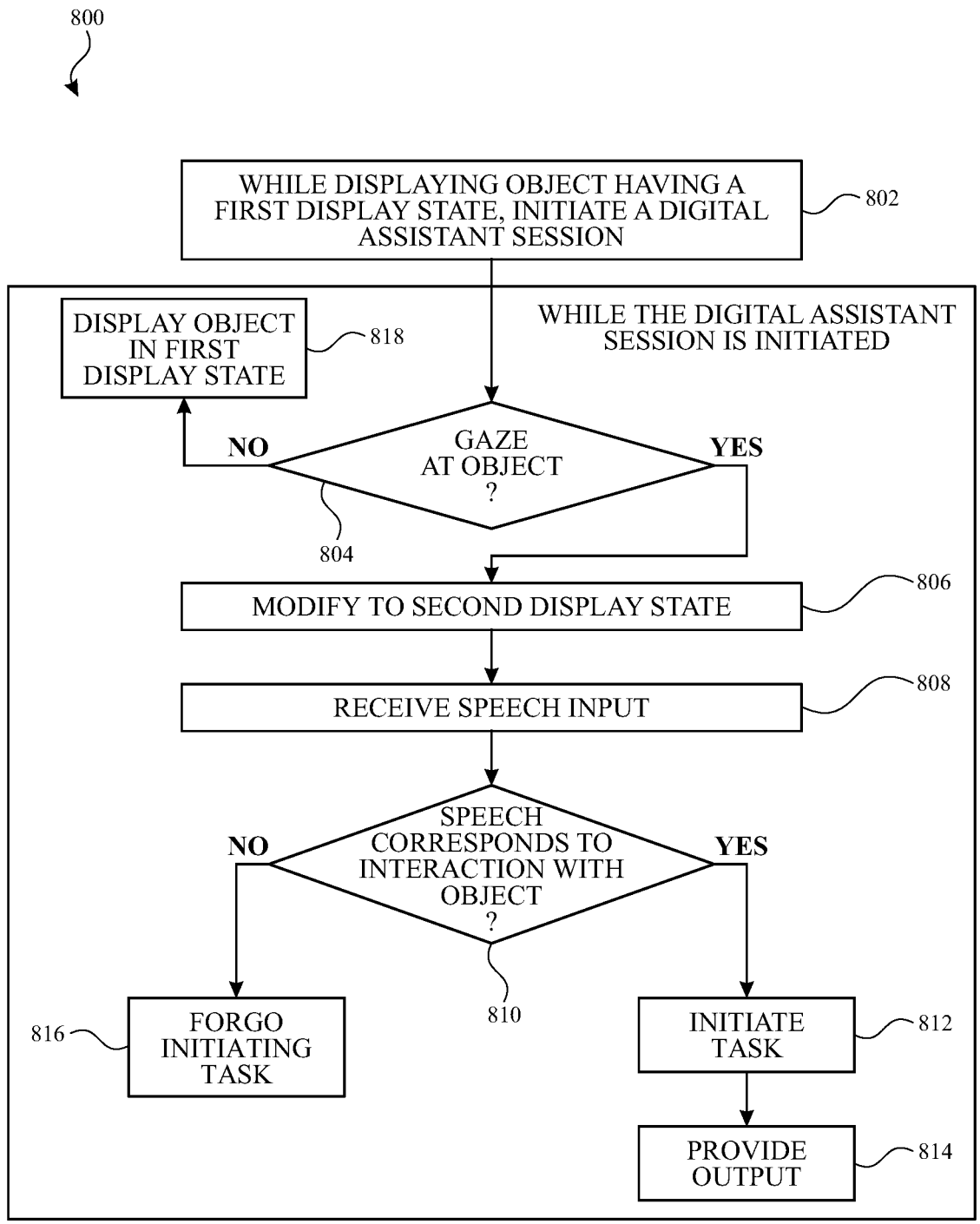
FIG. 8 illustrates a process for interacting with an extended reality (XR) environment, according to various examples.

FIG. 8 illustrates process 800 for interacting with an extended reality (XR) environment, according to various examples. Process 800 is performed, for example, at a device (e.g., device 302, device 500, device 550, device 600). In process 800, some operations are, optionally, combined, the orders of some operations are, optionally, changed, and some operations are, optionally, omitted. In some examples, additional operations are performed in combination with process 800.

At block 802, while displaying an object (e.g., objects 404, 406, 408, 410, 412, 414, 416) having a first display state, a digital assistant session is initiated responsive to receiving user input. In some examples, the digital assistant session is initiated when a second object representing a digital assistant (e.g., second object 312, object 418) is displayed. In some examples, the digital assistant session is initiated when the second object is displayed at a predetermined location. In some examples, the second object is initially displayed in a list of objects (e.g., list 306); the second object, when initially displayed in the list of objects, has a third display state; and the digital assistant session is initiated when a display state of the second object modifies to a fourth display state. In some examples, the user input corresponds to a selection of the second object. In some examples, the user input includes spoken trigger for initiating the digital assistant session.

In some examples, the object is a physical object in a physical environment. In some examples, the object is a virtual object. In some examples, the object includes an icon displayed in an application user interface.

In some examples, object recognition is performed to identify the object as a particular type of object. In some examples, the particular type of object includes text.

At block 804, while the digital assistant session is initiated, it is determined, based on captured user gaze input, whether a user gaze is directed at the object. At block 818, in accordance with a determination, based on captured user gaze input, that the user gaze is not directed at the object, the object is displayed in the first display state.

At block 806, in accordance with a determination, based on captured user gaze input, that the user gaze is directed at the object, the first display state of the object is modified to a second display state. In some examples, modifying the first display state of the object to the second display state is performed further in accordance with identifying the object as the particular type of object. In some examples, modifying the first display state of the object to the second display state includes displaying one or more suggested commands (e.g., commands 420, commands 422) to interact with the object.

In some examples, it is determined whether the object is of a predetermined type, where modifying the first display state of the object to the second display state is performed further in accordance with a determination that the object is of the predetermined type. In some examples, while the digital assistant session is initiated: in accordance with a determination, based on the captured user gaze input, that the user gaze is directed at the object and a determination that the object is not of the predetermined type: modifying the first display state of the object is forgone.

At block 808, after modifying the first display state to the second display state, a speech input (e.g., "save that address" in FIG. 4D) is received. In some examples, the speech input includes a deictic reference to the object.

At block 810, it is determined, based on the captured user gaze input, whether the speech input corresponds to interaction with the object. In some examples, determining that the speech input corresponds to interaction with the object includes determining, based on the captured gaze input, that the deictic reference refers to the object. In some examples, determining that the speech input corresponds to interaction with the object includes determining that the deictic reference refers to the object based on determining that the object is displayed in the second display state when the speech input is received. In some examples, determining whether the speech input corresponds to interaction with the object includes determining a timing of the user gaze at the object relative to a timing of the speech input. In some examples, determining whether the speech input corresponds to interaction with the object is performed without receiving a spoken trigger. In some examples, determining whether the speech input corresponds to interaction with the object is performed without receiving a gesture input corresponding to a selection of the object.

At block 812, in accordance with a determination that the speech input corresponds to interaction with the object, a task is initiated (e.g., by DA 200) based on the speech input and the object.

At block 814, an output indicative of the initiated task (e.g., "ok, I saved the address to your locations list" in FIG. 4D) is provided.

At block 816, in accordance with a determination that the speech input does not correspond to interaction with the object, initiation of the task is forgone.

In some examples, while the digital assistant session is not initiated: in accordance with a determination, based on the captured user gaze input, that the user gaze is directed at the object: modifying the first display state of the object is forgone. In some examples, while the digital assistant session is not initiated: an appendage of the user of the electronic device is detected; it is determined that the appendage corresponds to a predetermined pose; and while the appendage corresponds to the predetermined pose and in accordance with a determination, based on the captured user gaze input, that the user gaze is directed at the object: the first display state of the object is modified to the second display state, where forgoing modifying the first display state is performed while the appendage does not correspond to the predetermined pose.

The operations discussed above with respect to FIG. 8 are optionally implemented by the components depicted in FIGS. 1A-1B and 2A, e.g., by system 100 and DA 200.

In some examples, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In some examples, an electronic device is provided that comprises means for performing any of the methods or processes described herein.

In some examples, an electronic device is provided that comprises a processing unit configured to perform any of the methods or processes described herein.

In some examples, an electronic device is provided that comprises one or more processors and memory storing one or more programs for execution by the one or more processors, the one or more programs including instructions for performing any of the methods or processes described herein.

As described above, one aspect of the present technology is the gathering and use of data available from various sources to provide digital assistant interactions in an XR environment. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enhance a user's experience when interacting with an XR environment. Accordingly, use of such personal information data may enable users to more accurately and efficiently accomplish tasks related to the XR environment. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of using personal information for digital assistant interactions, the present technology can be configured to allow users to select to "opt in" or "opt out" of participation in the collection of personal information data during registration for services or anytime thereafter. In another example, users can select not to provide personal data for digital assistant interactions. In yet another example, users can select to limit the length of time for which personal data used for digital assistant interactions is retained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, digital assistant interactions can be provided based on non-personal information data or a bare minimum amount of personal information, such as the user's request to the digital assistant, other non-personal information available to the device, or publicly available information.

What is claimed is:

1. A non-transitory computer-readable storage medium storing one or more programs, the one or more programs comprising instructions, which when executed by one or more processors of an electronic device with one or more sensors, cause the electronic device to:
   while displaying a portion of an extended reality (XR) environment representing a current field of view of a user of the electronic device:
   detect, with the one or more sensors, a user gaze at a first object displayed in the XR environment, wherein the first object is persistent in the current field of view of the XR environment;

in response to detecting the user gaze at the first object, expand the first object into a list of objects, wherein the list of objects includes a second object representing a digital assistant;

detect, with the one or more sensors, a user gaze at the second object;

in accordance with detecting the user gaze at the second object, display a first animation of the second object indicating that a first digital assistant session is initiated;

receive a first audio input from the user of the electronic device; and display a second animation of the second object indicating that the digital assistant is actively listening to the user in response to receiving the first audio input, wherein the first animation is different from the second animation of the second object.

2. The non-transitory computer-readable storage medium of claim 1, wherein displaying the first animation of the second object includes displaying a change in a shape, a size, or a color of the second object.

3. The non-transitory computer-readable storage medium of claim 1, wherein displaying the first animation of the second object includes moving the second object away from the list of objects.

4. The non-transitory computer-readable storage medium of claim 1, wherein displaying the first animation of the second object includes:
ceasing to display of the list of objects.

5. The non-transitory computer-readable storage medium of claim 1, wherein displaying the first animation of the second object includes determining, based on the user gaze at the second object, that the first audio input is intended for the digital assistant.

6. The non-transitory computer-readable storage medium of claim 1, wherein the one or more programs further comprise instructions, which when executed by the one or more processors, cause the electronic device to:
while displaying the list of objects, receive a hand gesture from the user, the hand gesture corresponding to a selection of the second object; and
in response to receiving the hand gesture, display an animation of the second object, wherein the animation of the second object indicates that a second digital assistant session is initiated.

7. The non-transitory computer-readable storage medium of claim 1, wherein the one or more programs further comprise instructions, which when executed by the one or more processors, cause the electronic device to:
receive a second audio input including a spoken trigger for initiating a second digital assistant session; and
in response to receiving the second audio input, initiate the second digital assistant session, including displaying an animation of the second object.

8. The non-transitory computer-readable storage medium of claim 1, wherein displaying the second animation of the second object includes expanding and shrinking a size of the second object responsive to the first audio input.

9. The non-transitory computer-readable storage medium of claim 1, wherein the one or more programs further comprise instructions, which when executed by the one or more processors, cause the electronic device to:
display a virtual object in response to receiving the first audio input, the virtual object corresponding to a response, by the digital assistant, to the first audio input.

10. The non-transitory computer-readable storage medium of claim 9, wherein the virtual object and the second object are persistent in the current field of view of the XR environment.

11. The non-transitory computer-readable storage medium of claim 9, wherein the second object is persistent in the current field of view of the XR environment while the virtual object is positioned at a fixed location in the XR environment.

12. The non-transitory computer-readable storage medium of claim 9, wherein the virtual object and the second object are positioned at respective fixed locations in the XR environment.

13. The non-transitory computer-readable storage medium of claim 9, wherein the virtual object is displayed below the second object.

14. The non-transitory computer-readable storage medium of claim 9, wherein the virtual object is positioned within a predetermined distance from the second object in the XR environment.

15. The non-transitory computer-readable storage medium of claim 9, wherein the one or more programs further comprise instructions, which when executed by the one or more processors, cause the electronic device to:
receive, from the user, a request to interact with the virtual object; and
in response to receiving the request to interact with the virtual object, expand the virtual object into a user interface of an application corresponding to the virtual object.

16. The non-transitory computer-readable storage medium of claim 15, wherein:
the request to interact with the virtual object corresponds to moving the virtual object from an initial location to a destination location; and
expanding the virtual object into the user interface includes displaying the user interface at the destination location.

17. The non-transitory computer-readable storage medium of claim 15, wherein:
the second object is displayed while the user interface is displayed; and
the user can control the application using the second object by gazing at the second object or by speaking a trigger phrase.

18. The non-transitory computer-readable storage medium of claim 9, wherein the one or more programs further comprise instructions, which when executed by the one or more processors, cause the electronic device to:
receive a request to integrate the virtual object into a second application; and
in response to receiving the request to integrate the virtual object into the second application, integrate the virtual object into the second application, including:
displaying a content of the virtual object within a user interface of the second application.

19. The non-transitory computer-readable storage medium of claim 18, wherein:
while the content of the virtual object is displayed within the user interface of the second application:
the second object is displayed outside of the user interface of the second application.

20. The non-transitory computer-readable storage medium of claim 18, wherein:
while the content of the virtual object is displayed within the user interface of the second application:
the second object is displayed inside of the user interface of the second application.

21. The non-transitory computer-readable storage medium of claim 9, wherein the one or more programs further comprise instructions, which when executed by the one or more processors, cause the electronic device to:
in accordance with displaying the second object:
cease to display the second object a predetermined duration after displaying the virtual object; and
display the first object.

22. The non-transitory computer-readable storage medium of claim 9, wherein the one or more programs further comprise instructions, which when executed by the one or more processors, cause the electronic device to:
determine whether one or more digital assistant dismissal criteria are satisfied; and
in accordance with a determination that the one or more digital assistant dismissal criteria are satisfied, cease to display the second object, wherein satisfying the digital assistant dismissal criteria includes at least one of:
determining that the user's attention is not directed to the virtual object;
determining that the user's attention is not directed to the virtual object for at least a second predetermined duration; and
determining that the user has used a gesture to interact with a user interface element displayed in the XR environment, wherein the user interface element does not correspond to the digital assistant.

23. The non-transitory computer-readable storage medium of claim 1, wherein the one or more programs further comprise instructions, which when executed by the one or more processors, cause the electronic device to:
in accordance with displaying the second object:
cease to display the second object a third predetermined duration after receiving the first audio input from the user; and
display the first object.

24. The non-transitory computer-readable storage medium of claim 1, wherein expanding the first object into the list of objects includes:
displaying a third animation of the second object.

25. An electronic device, comprising:
one or more sensors;
one or more processors;
a memory; and
one or more programs, wherein the one or more programs are stored in the memory and configured to be executed by the one or more processors, the one or more programs including instructions for:
while displaying a portion of an extended reality (XR) environment representing a current field of view of a user of the electronic device:
detecting, with the one or more sensors, a user gaze at a first object displayed in the XR environment, wherein the first object is persistent in the current field of view of the XR environment;
in response to detecting the user gaze at the first object, expanding the first object into a list of objects, wherein the list of objects includes a second object representing a digital assistant;
detecting, with the one or more sensors, a user gaze at the second object;
in accordance with detecting the user gaze at the second object, displaying a first animation of the second object indicating that a first digital assistant session is initiated;
receiving a first audio input from the user of the electronic device; and
displaying a second animation of the second object indicating that the digital assistant is actively listening to the user in response to receiving the first audio input, wherein the first animation is different from the second animation of the second object.

26. A method, comprising:
at an electronic device with one or more processors, memory, and one or more sensors:
while displaying a portion of an extended reality (XR) environment representing a current field of view of a user of the electronic device:
detecting, with the one or more sensors, a user gaze at a first object displayed in the XR environment, wherein the first object is persistent in the current field of view of the XR environment;
in response to detecting the user gaze at the first object, expanding the first object into a list of objects, wherein the list of objects includes a second object representing a digital assistant;
detecting, with the one or more sensors, a user gaze at the second object;
in accordance with detecting the user gaze at the second object, displaying a first animation of the second object indicating that a first digital assistant session is initiated;
receiving a first audio input from the user of the electronic device; and
displaying a second animation of the second object indicating that the digital assistant is actively listening to the user in response to receiving the first audio input, wherein the first animation is different from the second animation of the second object.

27. The electronic device of claim 25, wherein displaying the first animation of the second object includes displaying a change in a shape, a size, or a color of the second object.

28. The electronic device of claim 25, wherein displaying the first animation of the second object includes moving the second object away from the list of objects.

29. The electronic device of claim 25, wherein displaying the first animation of the second object includes:
ceasing to display of the list of objects.

30. The electronic device of claim 25, wherein displaying the first animation of the second object includes determining, based on the user gaze at the second object, that the first audio input is intended for the digital assistant.

31. The electronic device of claim 25, wherein the one or more programs further include instructions for:
while displaying the list of objects, receiving a hand gesture from the user, the hand gesture corresponding to a selection of the second object; and
in response to receiving the hand gesture, displaying an animation of the second object, wherein the animation of the second object indicates that a second digital assistant session is initiated.

32. The electronic device of claim 25, wherein displaying the second animation of the second object includes expanding and shrinking a size of the second object responsive to the first audio input.

33. The electronic device of claim 25, wherein the one or more programs further include instructions for:
   displaying a virtual object in response to receiving the first audio input, the virtual object corresponding to a response, by the digital assistant, to the first audio input.

34. The electronic device of claim 33, wherein the virtual object and the second object are persistent in the current field of view of the XR environment.

35. The electronic device of claim 33, wherein the second object is persistent in the current field of view of the XR environment while the virtual object is positioned at a fixed location in the XR environment.

36. The electronic device of claim 33, wherein the virtual object and the second object are positioned at respective fixed locations in the XR environment.

37. The electronic device of claim 33, wherein the virtual object is displayed below the second object.

38. The electronic device of claim 33, wherein the virtual object is positioned within a predetermined distance from the second object in the XR environment.

39. The electronic device of claim 33, wherein the one or more programs further include instructions for:
   receiving, from the user, a request to interact with the virtual object; and
   in response to receiving the request to interact with the virtual object, expanding the virtual object into a user interface of an application corresponding to the virtual object.

40. The electronic device of claim 33, wherein the one or more programs further include instructions for:
   in accordance with displaying the second object:
      ceasing to display the second object a predetermined duration after displaying the virtual object; and
      displaying the first object.

41. The electronic device of claim 33, wherein the one or more programs further include instructions for:
   determining whether one or more digital assistant dismissal criteria are satisfied; and
   in accordance with a determination that the one or more digital assistant dismissal criteria are satisfied, ceasing to display the second object, wherein satisfying the digital assistant dismissal criteria includes at least one of:
      determining that the user's attention is not directed to the virtual object;
      determining that the user's attention is not directed to the virtual object for at least a second predetermined duration; and
      determining that the user has used a gesture to interact with a user interface element displayed in the XR environment, wherein the user interface element does not correspond to the digital assistant.

42. The electronic device of claim 25, wherein expanding the first object into the list of objects includes:
   displaying a third animation of the second object.

43. The method of claim 26, wherein displaying the first animation of the second object includes displaying a change in a shape, a size, or a color of the second object.

44. The method of claim 26, wherein displaying the first animation of the second object includes moving the second object away from the list of objects.

45. The method of claim 26, wherein displaying the first animation of the second object includes:
   ceasing to display of the list of objects.

46. The method of claim 26, wherein displaying the first animation of the second object includes determining, based on the user gaze at the second object, that the first audio input is intended for the digital assistant.

47. The method of claim 26, further comprising:
   while displaying the list of objects, receiving a hand gesture from the user, the hand gesture corresponding to a selection of the second object; and
   in response to receiving the hand gesture, displaying an animation of the second object, wherein the animation of the second object indicates that a second digital assistant session is initiated.

48. The method of claim 26, wherein displaying the second animation of the second object includes expanding and shrinking a size of the second object responsive to the first audio input.

49. The method of claim 26, further comprising:
   displaying a virtual object in response to receiving the first audio input, the virtual object corresponding to a response, by the digital assistant, to the first audio input.

50. The method of claim 49, wherein the virtual object and the second object are persistent in the current field of view of the XR environment.

51. The method of claim 49, wherein the second object is persistent in the current field of view of the XR environment while the virtual object is positioned at a fixed location in the XR environment.

52. The method of claim 49, wherein the virtual object and the second object are positioned at respective fixed locations in the XR environment.

53. The method of claim 49, wherein the virtual object is displayed below the second object.

54. The method of claim 49, wherein the virtual object is positioned within a predetermined distance from the second object in the XR environment.

55. The method of claim 49, further comprising:
   receiving, from the user, a request to interact with the virtual object; and
   in response to receiving the request to interact with the virtual object, expanding the virtual object into a user interface of an application corresponding to the virtual object.

56. The method of claim 49, further comprising:
   in accordance with displaying the second object:
      ceasing to display the second object a predetermined duration after displaying the virtual object; and
      displaying the first object.

57. The method of claim 49, further comprising:
   determining whether one or more digital assistant dismissal criteria are satisfied; and
   in accordance with a determination that the one or more digital assistant dismissal criteria are satisfied, ceasing to display the second object, wherein satisfying the digital assistant dismissal criteria includes at least one of:
      determining that the user's attention is not directed to the virtual object;
      determining that the user's attention is not directed to the virtual object for at least a second predetermined duration; and
      determining that the user has used a gesture to interact with a user interface element displayed in the XR environment, wherein the user interface element does not correspond to the digital assistant.

58. The method of claim 26, wherein expanding the first object into the list of objects includes:
 displaying a third animation of the second object.

\* \* \* \* \*